(12) United States Patent
Iisaka et al.

(10) Patent No.: US 7,417,618 B2
(45) Date of Patent: Aug. 26, 2008

(54) LIGHTING APPARATUS AND PROJECTION TYPE DISPLAY, AND DRIVING METHOD THEREFOR

(75) Inventors: Hidehito Iisaka, Shiojiri (JP); Shoichi Uchiyama, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 289 days.

(21) Appl. No.: 11/193,354

(22) Filed: Aug. 1, 2005

(65) Prior Publication Data
US 2005/0270268 A1     Dec. 8, 2005

Related U.S. Application Data

(62) Division of application No. 10/263,906, filed on Oct. 4, 2002, now Pat. No. 6,947,025.

(30) Foreign Application Priority Data

Oct. 9, 2001  (JP)  ............................. 2001-311337
Jul. 12, 2002 (JP)  ............................. 2002-203927

(51) Int. Cl.
*G09G 3/34*  (2006.01)
*G02F 1/1335* (2006.01)

(52) U.S. Cl. .................. 345/108; 345/109; 345/87; 349/5; 359/20

(58) Field of Classification Search ............... 345/7–8, 345/108, 109, 63, 101, 690; 359/210–226, 359/5, 6, 20, 2, 200, 578, 594; 353/31, 38, 353/84; 435/110; 349/5, 7
See application file for complete search history.

(56) References Cited

U.S. PATENT DOCUMENTS

| 5,053,934 | A |   | 10/1991 | Krebs |
| 5,083,854 | A | * | 1/1992  | Zampolin et al. ............. 349/5 |
| 5,392,140 | A | * | 2/1995  | Ezra et al. ..................... 349/95 |
| 5,418,093 | A |   | 5/1995  | Asai et al. |
| 5,627,626 | A |   | 5/1997  | Inoue et al. |
| 5,717,422 | A |   | 2/1998  | Fergason |
| 5,805,244 | A |   | 9/1998  | Suh et al. |
| 5,808,697 | A |   | 9/1998  | Fujimura et al. |
| 5,863,125 | A |   | 1/1999  | Doany |
| 6,000,802 | A |   | 12/1999 | Hashizume et al. |
| 6,084,714 | A |   | 7/2000  | Ushiyama et al. |

(Continued)

FOREIGN PATENT DOCUMENTS

CN     1340738 A     3/2002

(Continued)

*Primary Examiner*—David L Lewis
(74) *Attorney, Agent, or Firm*—Oliff & Berridge, PLC

(57) ABSTRACT

A lighting apparatus used for a projection type display is provided, which can change the incident ray volume to an optical modulation device without changing the optical output intensity of the lamp, and can exhibit excellent effects in expressive power of an image and adaptability to the use environment. The lighting apparatus of the present invention comprises; a light source, two fly-eye lenses constituting a uniform lighting device, and a shading plate arranged between these fly-eye lenses and constituting a dimming device for adjusting the amount of light of the outgoing light from the light source. The angle of inclination of the shading plate is controlled based on an image signal supplied to the optical modulation device, thereby enabling adjustment of the amount of light.

21 Claims, 16 Drawing Sheets

U.S. PATENT DOCUMENTS

| | | | |
|---|---|---|---|
| 6,091,911 A | 7/2000 | Sakano et al. | |
| 6,332,684 B1 | 12/2001 | Shibatani et al. | |
| 6,379,010 B1 | 4/2002 | Suzuki et al. | |
| 6,559,901 B2 | 5/2003 | Yamamoto et al. | |
| 6,568,810 B2 | 5/2003 | Hori | |
| 6,624,756 B1 | 9/2003 | Butterworth | |
| 6,683,657 B1 | 1/2004 | Miyawaki | |
| 6,775,048 B1 * | 8/2004 | Starkweather et al. | ...... 359/291 |
| 6,795,053 B1 | 9/2004 | Funamoto et al. | |
| 6,816,141 B1 | 11/2004 | Fergason | |
| 6,992,718 B1 | 1/2006 | Takahara | |
| 7,265,743 B2 | 9/2007 | Funamoto et al. | |
| 2001/0015775 A1 | 8/2001 | Yamamoto et al. | |
| 2002/0072099 A1 | 6/2002 | Mockel et al. | |
| 2003/0142275 A1 | 7/2003 | Yoshida | |
| 2004/0201562 A1 | 10/2004 | Funamoto et al. | |

FOREIGN PATENT DOCUMENTS

| | | |
|---|---|---|
| DE | 10107315 A1 | 8/2001 |
| EP | 1170959 A2 | 1/2002 |
| FR | 2805351 A1 | 8/2001 |
| JP | A 3-179886 | 8/1991 |
| JP | A-3-261284 | 11/1991 |
| JP | A-4-34594 | 2/1992 |
| JP | A-05-303085 | 11/1993 |
| JP | A-9-65252 | 3/1997 |
| JP | A-10-339852 | 12/1998 |
| JP | A-11-65531 | 3/1999 |
| JP | A-11-231264 | 8/1999 |
| JP | A-11-281923 | 10/1999 |
| JP | A-2000-122178 | 4/2000 |
| JP | A 2000-194067 | 7/2000 |
| JP | A-2000-338448 | 12/2000 |
| JP | A-2001-27890 | 1/2001 |
| JP | A-2001-100699 | 4/2001 |
| JP | A 2001-228569 | 8/2001 |
| JP | A-2001-264728 | 9/2001 |
| JP | A 2002-23106 | 1/2002 |
| JP | A 2002-90705 | 3/2002 |
| JP | A 2002-090705 | 3/2002 |
| JP | A-2002-196302 | 7/2002 |
| KR | 2002-0004837 A | 1/2002 |

* cited by examiner

| $A_{11}$ | $A_{12}$ | $A_{13}$ | ... | ... | $A_{1n}$ |
|---|---|---|---|---|---|
| $A_{21}$ | ... | ... | | | |
| $A_{31}$ | ... | ... | | | |
| ⋮ | ... | ... | | | |
| ⋮ | ... | ... | | | |
| $A_{m1}$ | ... | ... | | | $A_{mn}$ |

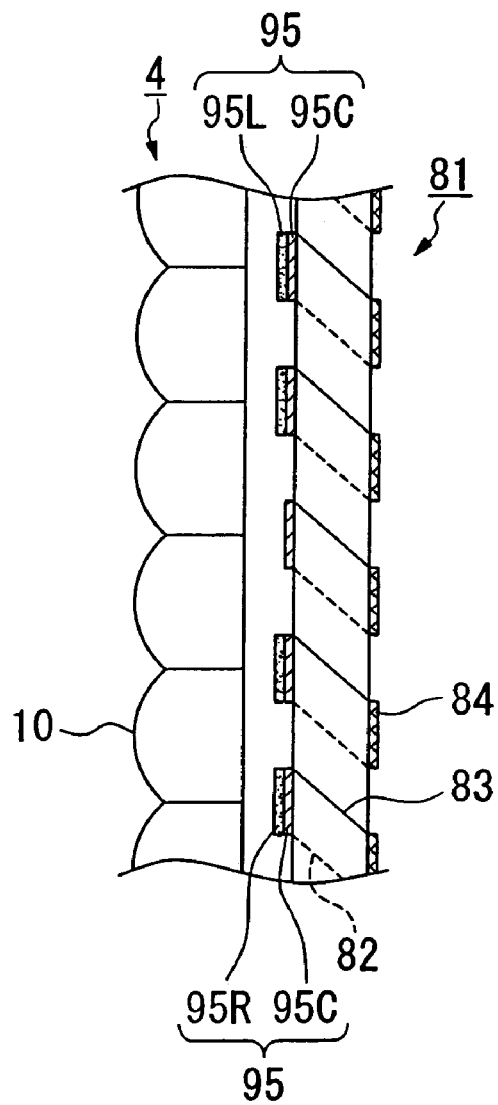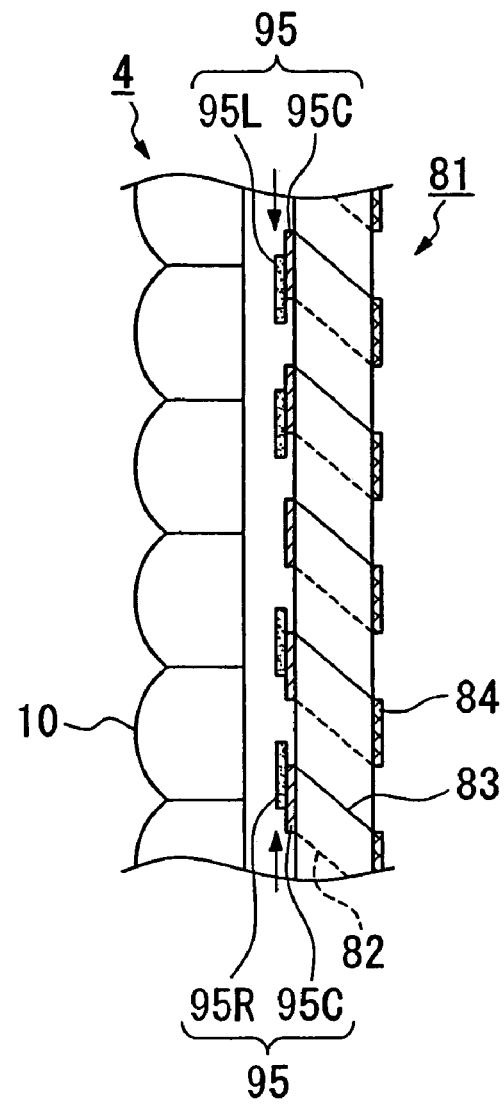

LIGHTING APPARATUS AND PROJECTION TYPE DISPLAY, AND DRIVING METHOD THEREFOR

This is a Division of application Ser. No. 10/263,906 filed Oct. 4, 2002. The entire disclosure of the prior application is hereby incorporated by reference herein in its entirety.

TECHNICAL FIELD

The present invention relates to a lighting apparatus, and a projection type display and a driving method therefor. More specifically, the present invention relates to a projection type display, which is excellent in image expressive power and which can obtain images having a brightness which suits a use environment and a user's preference, and a lighting apparatus used therefor.

BACKGROUND ART

Recent development of information equipment is remarkable, and demand for thin displays having high resolution and low power consumption is increasing with research and development advancing. Amongst these, the liquid crystal display for which the optical properties can be changed by electrically controlling the arrangement of the liquid crystal molecules, is anticipated as a display that can correspond to the above needs. As one form of such a liquid crystal display, a projection type liquid crystal display (liquid crystal projector) is known, which enlarges and projects an image emitted from an optical system using a liquid crystal light valve, onto a screen through a projection lens.

The projection type liquid crystal display uses a liquid crystal light valve as an optical modulation device, but a projection type display which uses a digital mirror device (hereinafter referred to as DMD) as the optical modulation device, instead of the liquid crystal light valve, has been put to practical use. However, this type of conventional projection type display has problems as described below.

(1) Due to leakage of light and stray light, which occur in various optical elements constituting an optical system, sufficient contrast cannot be obtained. Therefore, the gradient range (dynamic range) which can be displayed is narrow, and the image quality and power is inferior, as compared with an existing television receiver using a cathode ray tube (hereinafter referred to as CRT).

(2) Even if it is attempted to improve the image quality by various kinds of image signal processing, since the dynamic range is fixed, a sufficient effect cannot be demonstrated.

As a solution for the problems of the projection type display, that is, as a method of extending the dynamic range, it can be considered to change the amount of light shone onto the optical modulation device (light valve) corresponding to the image signal. The simplest method for realizing this is to change the optical output intensity of the lamp. In the projection type liquid crystal display, a method of controlling the output light of a metal halide lamp is disclosed in Japanese Unexamined Patent Application, First Publication No. Hei 3-179886.

As a lamp used in the projection type liquid crystal display, a high-pressure mercury-vapor lamp is mainstream at present. However, it is quite difficult to control the optical output intensity with the high-pressure mercury-vapor lamp. Therefore, a method is desired in which the amount of incident light to the optical modulation device can be changed corresponding to the image signal, without changing the optical output intensity itself of the lamp.

Moreover, in addition to the above problems, since the brightness of a light source is fixed in the current projection type display, there are problems in that the screen becomes too bright, for example, in a dark viewing environment, and that when the projection screen size is changed by the projection distance or zooming of a projection lens, the brightness of the screen changes corresponding thereto.

DISCLOSURE OF THE INVENTION

The present invention has been achieved in order to solve the above problems, with the object of providing a projection type display, which can change the amount of incident light to the optical modulation device without changing the optical output intensity of the lamp, and can exhibit excellent effects in image expressive power and adaptability with respect to a use environment, and a lighting apparatus used therefor.

In order to achieve the above object, the lighting apparatus of the present invention is a lighting apparatus used for lighting an optical modulation device in a projection type display, comprising: a light source, a uniform lighting device which equalizes the illuminance distribution of light shone from the light source, and a dimming device for adjusting the amount of light emitted from the light source, which is arranged on an optical axis of the light emitted from the light source, wherein the amount of light emitted from the uniform lighting device can be adjusted, by controlling the dimming device based on information from outside.

The present inventors have found that it is only necessary to add a dimming device for adjusting the amount of light based on the information from outside to a conventional lighting apparatus, as a means for adjusting the amount of light shone onto an area to be lighted corresponding to an image, without changing the optical output intensity of the light source. The above "information from outside" includes information based on an image signal supplied to the optical modulation device, information based on a projection enlargement ratio, information based on the brightness under the use environment, and information based on a user's preference.

In other words, according to the lighting apparatus of the present invention, the dimming device for adjusting the amount of light of the outgoing beam from the light source is provided, and the dimming device is controlled based on the information from outside. Therefore, when the projection type display is used, and when the information from outside is, for example, information based on an image signal, the amount of light of the outgoing beam from the light source is adjusted by the action of the dimming device, such that the amount of light increases when the image scene at that time is a bright scene, and the amount of light drops when the image scene is a dark scene. In this manner, even if the optical output intensity of the light source is constant, light having a brightness corresponding to the image can be obtained in the area to be illuminated, thus contributing to an extension of the dynamic range of the projection type display. Similarly, a projection enlargement ratio, brightness under the use environment, or light having a brightness corresponding to the user's preference can be obtained.

As a specific form of the uniform lighting device, for example, there is a rod lens. In the present invention, however, there can be preferably used one constituted of fly-eye lenses arranged sequentially from one close to the light source along the optical axis, and a convolution lens for superimposing a plurality of secondary light source images formed by the fly-eye lenses on the lighting plane. In the uniform lighting device using the fly-eye lenses, a plurality of secondary light source images are formed by the fly-eye lenses, and the plurality of secondary light source images are superimposed by a second fly-eye lens and a condenser lens provided in the subsequent stage as the convolution lens, to thereby equalize the illuminance distribution of the original light of the light source.

As a specific form of the dimming device, there can be used one in which the dimming device comprises a shading member constructed such that at least a part of the outgoing beam from the light source can be cut off, and the shaded area of the outgoing beam by the shading member can be adjusted.

According to this construction, the degree of shading of the outgoing beam from the light source can be easily adjusted by the action of the shading member, and a dimming device suitable for the lighting apparatus of the present invention can be realized.

As the position for installing the shading member, three positions can be considered, that is, between the fly-eye lens and the convolution lens, on the outgoing side of the convolution lens, and between the fly-eye lens and the light source.

Particularly, when the shading member is provided between the first fly-eye lens and the convolution lens, or on the outgoing side of the convolution lens, it is desired that the shading member be arranged in the vicinity of the focal point of each lens constituting the fly-eye lens.

The beams of light emitted from the fly-eye lens are once narrowed down in the vicinity of the focal point of each lens constituting the fly-eye lens. However, when the shading member is arranged here, extinction is carried out in the area where the beams of light are narrowed down, and hence dimming can be carried out without affecting the illuminance distribution in the area to be lighted. Since a gap corresponding to the focal length of the fly-eye lens is provided beforehand in this portion, even if the shading member is arranged in the gap, it is not necessary to change the optical arrangement of other parts.

As a specific form of the shading member, there can be exemplified one in which the shading member comprises a shading plate constructed so as to be able to move in the direction parallel with the principal plane thereof, and the amount of light can be adjusted by the shift amount of the shading plate.

According to this construction, for example, some type of shading plate drive mechanism is provided on the shading plate to constitute a shading plate capable of moving in a parallel direction, to thereby change the amount of light shaded by the shading plate. As a result, the amount of light passing through the place where the shading plate is arranged can be easily adjusted.

Alternatively, there can be exemplified one in which the shading member comprises a shading plate constructed so as to be rotatable about a rotation shaft extending in a parallel direction with the principal plane thereof, and the amount of light can be adjusted by the rotation angle of the shading plate.

According to this construction, for example, a stepping motor is connected to the rotation shaft to rotate the shading plate, thereby enabling the amount of light passing through the place where the shading plate is arranged to be adjusted easily and with good responsiveness. For example, if the shading plate is arranged such that the plate face of the shading plate is parallel with the optical axis, the transmittance of light can be brought to a value close to 100%. If the shading plate is rotated until the plate face of the shading plate has a predetermined angle with respect to the optical axis, extinction is possible up to a minimum transmittance in a set range, and hence light having a desired brightness can be obtained in the area to be lighted.

Preferably the shading member performs shading in linear symmetry with respect to each of the beams of light emitted from the fly-eye lenses. More preferably, it is desirable to perform shading centrosymmetrically with respect to the center of each beam of light.

As described above, in the vicinity of the focal point of each lens constituting the fly-eye lens, the beams of light due to the plurality of secondary light source images formed by the fly-eye lenses are narrowed down. However, when the beams of light are shaded by using the shading member, the effect of equalization of the illuminance distribution is hindered, if shading is performed excessively. To be specific, for example, if all beams of light are shaded from one side, the illuminance distribution may have a polarization such that only one side of the area to be illuminated becomes bright and the remaining other side is dark. As a countermeasure for this problem, if shading is performed in linear symmetry with respect to an axis passing through the center of the beams of light, the illuminance distribution in the area to be illuminated becomes linearly symmetrical with respect to the axis passing through the center of the area to be illuminated. Therefore, even if the light having passed through the uniform lighting device has a slight illuminance distribution, the appearance of a projected image can be improved, as compared with a case where the illuminance distribution in the area to be illuminated has a polarization.

Moreover, if shading is performed centrosymmetrically with respect to the center of each lens, a shading form well matched with the illuminance distribution of the original light of the light source can be obtained, thereby enabling further equalization of the illuminance distribution.

Furthermore, the shading member may have a construction such that shading is performed in linear symmetry with respect to an axis passing through the center of the whole group of beams, instead of the construction in which shading is performed in linear symmetry with respect to an axis passing through the respective centers of the beams emitted from the fly-eye lenses. In this case, more preferably, shading is performed centrosymmetrically with respect to the center of the whole group of beams.

In the case of this construction, the same action and effects can be obtained as in the case where shading is performed in linear symmetry with respect to an axis passing through the center of each lens. In other words, a polarization occurs in brightness due to shading, for each of the secondary light source images, but by having this polarization, the illuminance distribution in the area to be illuminated where these secondary light source images are superimposed can be made uniform.

As a specific means for performing shading symmetrically as described above, for example, a construction may be adopted comprising, for example, the shading member arranged between the adjacent beams of light emitted from the fly-eye lens, and two shading plates having a slit opening provided perpendicularly to the optical axis, and these two shading plates are movable in a direction parallel with the respective principal planes and in an opposite direction to each other. Alternatively, the construction may be such that the shading member comprises at least three shading plates provided perpendicularly to the optical axis, and one of the at least three shading plates is fixed in position, and the remaining shading plates located at a position of linear symmetry with respect to the center line of the whole group of beams are movable in an opposite direction to each other.

In addition to the above construction, the lighting apparatus of the present invention may have a polarized beam splitter (hereinafter referred to as PBS) array for equalizing the polarized state of the outgoing beam from the light source in one direction, in the vicinity of the focal position of each lens constituting the fly-eye lens.

According to this construction, for example, when the lighting apparatus of the present invention is used in a projection type display such as a liquid crystal projector, in which display is performed by using only light in one polarized direction, the polarization of the outgoing beam from the light source can be converted so as to equalize the polarization to that on the side used in the liquid crystal light valve in the PBS array. As a result, the use efficiency of the light can be increased.

In this case, if two shading plates capable of moving in a parallel direction are used as the shading member, at least one of the two shading plates preferably serves as a shading plate which prevents the outgoing beam from the light source from directly entering onto a reflection film on the PBS array.

According to this construction, the apparatus configuration extending from the PBS array to the shading member of the present invention can be simplified.

In the above construction, it is desirable to provide a second fly-eye lens on the incident side of the PBS array, and to provide a gap in at least either one of between the second fly-eye lens and the shading plate, and between the PBS array and the shading plate.

According to this construction, for example, cooling air can be made to flow in the gap, and the shading plate whose temperature has increased by shading the strong beam from the light source can be cooled.

It is desired that the rotation shaft of the shading plate be arranged at a place between beams of light emitted from the fly-eye lens.

According to this construction, the portion between respective beams of the plurality of beams of light emitted from the fly-eye lens is a portion where the light collected by the fly-eye lens does not reach. Therefore, when the rotation shaft is arranged in this position, and the shading plate is positioned so that the plate face of the shading plate becomes parallel with the optical axis, the beam is hardly cut off, and the brightness does not drop when dimming is not performed.

Needless to say, the shading plate may have uniform transmittance of light overall, but may also have an area in which the transmittance of light is partially different. Specifically, for example, the shading plate is formed by a plate obtained by forming a metal thin film on a glass, and the film thickness may have a distribution. Alternatively, for example, when the shading plate is formed in a rectangular shape, a corrugation may be added to the edge, rather than forming in a simple linear form.

As described above, when an area where the transmittance of light is partially different is provided in the shading plate, shading is performed in a random distribution with respect to each of the plurality of secondary light source images created by the fly-eye lenses. Therefore, by superimposing these secondary light source images, these distributions blend with each other, to thereby equalize the illuminance distribution, to increase the uniformity of illuminance in the area to be illuminated.

The shading plate may be provided as only one, or a plurality of shading plates may be arranged along a plane perpendicular to the optical axis.

When a plurality of shading plates is arranged, the size of each shading plate can be made small. Hence, it becomes possible to arrange the shading plate close to the focal position of each lens constituting the fly-eye lens. As a result, dimming can be performed without affecting the illuminance distribution in the area to be illuminated. If a small shading plate is used, it can be inserted in the existing uniform lighting device without changing the arrangement thereof, and the lighting apparatus does not become large.

Particularly, when a plurality of shading plates is arranged corresponding to each row of beams of light emitted from the fly-eye lens, the size of the shading plate can be made smallest, and hence the above described effects can be reliably obtained.

Moreover, when a plurality of shading plates is rotated in an opposite direction to each other centering on a center line of the group of beams emitted from the fly-eye lens, thus resulting in shading in linear symmetry with respect to the center of the whole group of beams, more uniform lighting can be obtained.

When a plurality of shading plates is provided, the construction may be such that these shading plates are rotated all at once with the same angle. However, a construction in which only a part of the shading plates is rotated and the remaining shading plates are left to stand still, or a construction in which a plurality of shading plates is rotated with a different rotation angle, or a construction combining these may be used to perform dimming.

According to these constructions, more delicate dimming can be performed.

When the location of the shading plate is between the fly-eye lens and the light source, since the illuminance distribution of the light source is originally large, then even if the shading plate is inserted between the fly-eye lens and the light source, the illuminance distribution is not largely affected. Hence, the illuminance distribution in the area to be illuminated can be made small.

Moreover, when the shading plate is arranged in this position, the construction in which a plurality of shading plates is arranged along the plane perpendicular to the optical axis, or only a part of shading plate of the plurality of shading plates is rotated, or the plurality of shading plates is rotated with a different rotation angle can be adopted, as in the above described case (in which the shading plate is arranged between the fly-eye lens and the convolution lens). Also in these cases, the same effects as above can be obtained. When a plurality of shading plates is used in this arrangement, the distance between the light source and the uniform lighting device can be reduced, and hence the apparatus can be made small.

Furthermore, when a plurality of shading plates is arranged, these shading plates may be formed so as to be able to rotate integrally about one axis of rotation, instead of separately driving these shading plates.

According to this construction, even if the number of shading plates is plural, only one rotation shaft is required, and hence the apparatus configuration including the rotation mechanism can be simplified.

Moreover, the size and pitch of the plurality of shading plates may be uniform, or may be different depending on the location.

In this manner, by optimizing the overall design of the shading plates, the illuminance distribution in the area to be illuminated can be favorably maintained.

As described above, if the rotation shaft of the shading plate is arranged so as to follow the boundary of a plurality of lenses constituting the fly-eye lens, an effect can be obtained that the brightness does not drop when dimming is not performed. However, when the rotation shaft of the shading plate is inclined with respect to the arrangement direction of a plurality of lenses constituting the fly-eye lens, there is a place where the rotation shaft always goes across the center of the lens. Hence, there is concern that the brightness may drop slightly, even if dimming is not performed. However, in this construction, shading is performed in a different area depending on each lens, and hence when the images are superimposed, the illuminance distribution is equalized, and the uniformity of illuminance in the area to be illuminated can be increased, as in the case where the corrugation is added to the edge of the shading plate.

With regard to shading using the shading member, if the light is reflected on the surface of the shading member, the reflected light may adversely affect the display. By using a material having optical absorptivity at least on the surface irradiated by the light, of the shading member, unnecessary occurrence of reflected light can be suppressed, and the display quality can be enhanced. Since it is not necessary to arrange the light absorbing material in other parts, the apparatus configuration becomes simple.

On the other hand, a material having optical reflectivity may be used at least on the surface irradiated by the light, of the shading member. In this case, it is desirable to have a construction such that the shading member rotates so that the reflected light from the shading member is radiated outside of the lighting optical path.

According to this construction, the situation where the reflected light from the shading member unnecessarily scatters to adversely affect the display can be prevented.

When a shading member having optical reflectivity on the surface is used, it is desirable to have a construction such that a desired minimum transmitted amount of light can be obtained with an angle such that the reflected light from the shading plate does not return to the light source.

According to this construction, the situation where the reflected light from the shading member is reflected again by a reflector or the like provided in the light source, and unnecessarily scatters or interferes with the beam of the light source, to thereby adversely affect the display can be prevented.

When a shading member having optical reflectivity is used, it is desirable to provide a light absorbing material for absorbing the reflected light at a position where the reflected light from the shading plate reaches.

According to this construction, even in the case where a constituent of the lighting apparatus is arranged at a position where the reflected light from the shading plate reaches, a situation where the temperature of the constituent increases to cause a problem can be avoided.

A projection type display of the present invention is a projection type display having a lighting device, an optical modulation device which modulates the beam emitted from the lighting device, and a projection device which projects the beam modulated by the optical modulation device, which comprises the lighting apparatus of the present invention as the lighting device.

According to this construction, since the lighting apparatus which can obtain light having a desired brightness in the area to be illuminated, even when the optical output intensity of the light source is constant, is provided, the dynamic range of the projection type display can be extended. As a result, a projection type display, which is excellent in image expressive power and adaptability to the use environment can be realized.

The driving device of the projection type display of the present invention preferably comprises: a control signal determination device which determines a control signal which controls the dimming device based on an image signal per one frame constituting an image; a dimming control device which controls the dimming device based on the control signal; and an image signal extension device which extends the image signal based on the control signal.

According to this construction, a control signal for controlling the dimming device is determined based on the image signal per one frame constituting an image, by the control signal determination device, and then the dimming control device controls the dimming device based on the control signal, to supply light to the optical modulation device, with the brightness changing depending on the image, and the image signal extension device extends the image signal based on the control signal. By this operation, the dynamic range of the projection type display can be extended, and a projection type display, which is excellent in image expressive power and adaptability to the use environment can be realized.

The driving method for a projection type display of the present invention is a driving method for the abovementioned projection type display according to the present invention, wherein a control signal for controlling the dimming device is determined based on an image signal per one frame constituting an image, and the dimming device is controlled based on the control signal, to thereby adjust the amount of light which illuminates the optical modulation device, and to extend the image signal based on the control signal, and this extended image signal is supplied to the optical modulation device to thereby generate an image.

According to this construction, the dynamic range of the projection type display can be extended, and an image having high image expressive power can be obtained.

BRIEF DESCRIPTION OF THE DRAWINGS

FIGS. 20A and 20B are enlarged plan views showing a lighting apparatus according to a ninth embodiment of the present invention, taking out only the portion of a second fly-eye lens and a PBS array, FIG. 20A showing a state where dimming is not applied, and FIG. 20B showing a state where dimming is applied.

BEST MODE FOR CARRYING OUT THE INVENTION

[Projection Type Display]

One embodiment of the present invention will be described with reference to the drawings.

At first, a projection type liquid crystal display, being one example of a projection type display having the lighting apparatus of the present invention, will be described with reference to FIG. 9 through FIG. 13.

Figure 9:
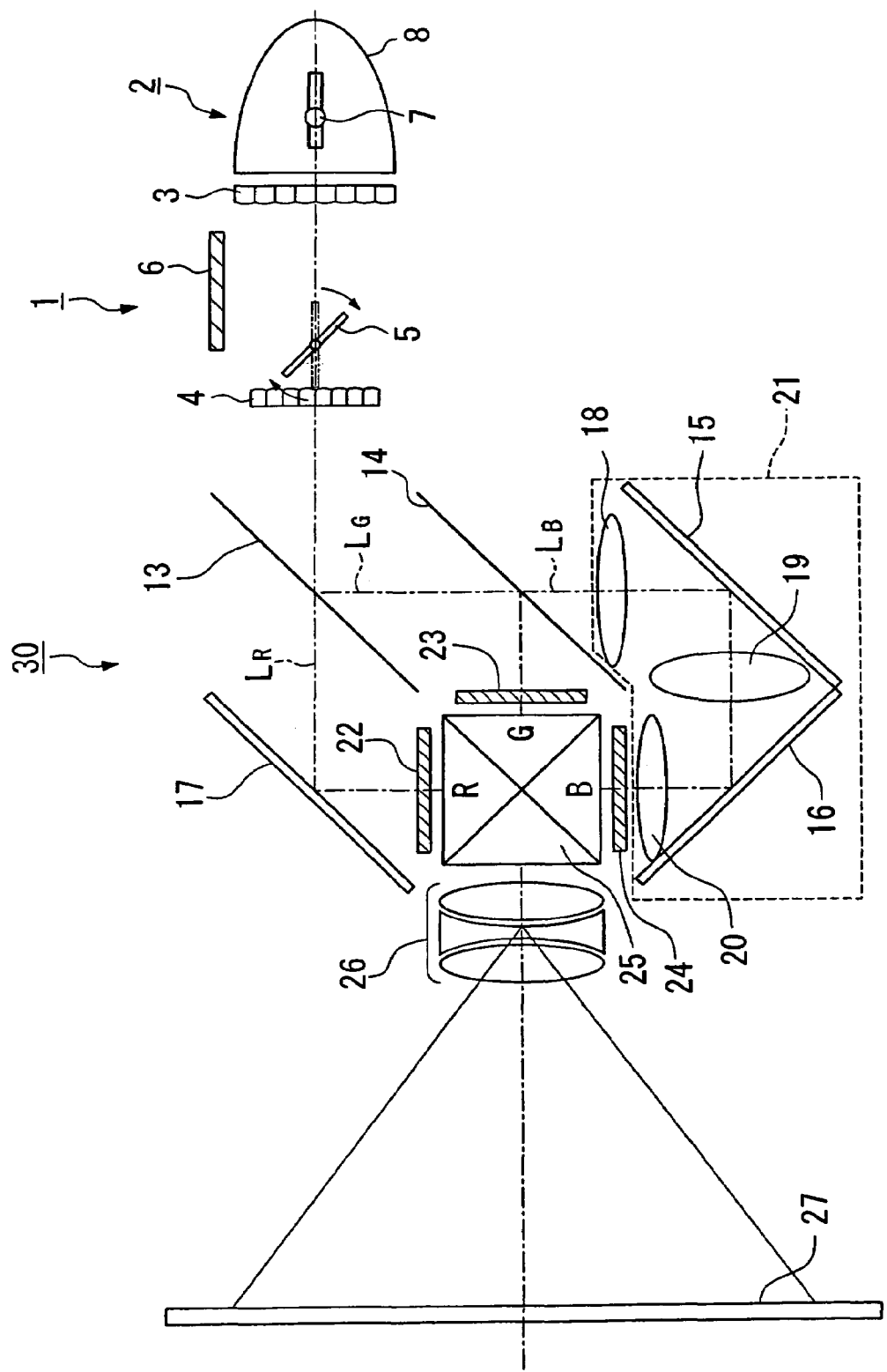
FIG. 9 is a diagram showing a schematic configuration of a projection type liquid crystal display in the first embodiment of the present invention.

The projection type liquid crystal display of this embodiment is a projection type color liquid crystal display of a three-plate type, comprising a transmission type liquid crystal light valve for each color of R (red), G (green) and B (blue). FIG. 9 is a diagram showing a schematic configuration of this projection type liquid crystal display, wherein reference symbol 1 denotes a lighting apparatus, 2 denotes a light source, 3 and 4 denote fly-eye lenses (uniform lighting devices), 5 denotes a shading plate (dimming device), 13 and 14 denote dichroic mirrors, 15, 16 and 17 denote reflection mirrors, 22, 23 and 24 denote liquid crystal light valves (optical modulation devices), 25 denotes a cross dichroic prism, and 26 denotes a projection lens (projection device).

The lighting apparatus 1 of this embodiment comprises the light source 2, the fly-eye lenses 3 and 4, the shading plate 5 and a light absorbing body 6. The light source 2 comprises a lamp 7 such as a high-pressure mercury lamp, and a reflector 8 for reflecting the light of the lamp 7. Moreover, as the uniform lighting device for equalizing the illuminance distribution of the light of the light source in the liquid crystal light valves 22, 23 and 24, being an area to be illuminated, a first fly-eye lens 3 and a second fly-eye lens 4 are sequentially arranged from the light source 2 side. The first fly-eye lens 3 forms a plurality of secondary light source images, and the second fly-eye lens 4 has a function as a convolution lens for superimposing these images at the position of the light valve. According to circumstances, a condenser lens for superimposing the secondary light source images may be arranged at the position of the second fly-eye lens 4, or on the subsequent stage thereof. Hereinafter, explanation will be given for a case where the second fly-eye lens is used as the convolution lens. The second fly-eye lens 4 is used in combination with the PBS array described later, to form a polarization converting element.

In the case of this embodiment, the shading plate 5 is arranged rotatably between the first fly-eye lens 3 and the second fly-eye lens 4, as the dimming device for adjusting the amount of light of the beam emitted from the light source 2. The light absorbing body 6 is arranged above the first fly-eye lens 3 and the second fly-eye lens 4. The configuration of the lighting apparatus will be described later in detail.

The construction of the subsequent stage of the lighting apparatus 1 will be described, together with the action of each constituent.

The dichroic mirror 13 for reflecting blue light and green light transmits red light $L_R$ of the beams of light from the light source 2, and reflects blue light $L_B$ and green light $L_G$. The red light $L_R$ transmitted through the dichroic mirror 13 is reflected by the reflection mirror 17 and enters into the liquid crystal light valve for red color 22. On the other hand, the green light $L_G$, of the colored light reflected by the dichroic mirror 13, is reflected by the dichroic mirror 14 for reflecting the green color, and enters into the liquid crystal light valve for green color 23. On the other hand, the blue light $L_B$ transmits through the dichroic mirror 14, and enters into the liquid crystal light valve for blue color 24, through a relay system 21 comprising a relay lens 18, the reflection mirror 15, a relay lens 19, the reflection mirror 16 and a relay lens 20.

The three colored lights modulated by the respective liquid crystal light valves 22, 23 and 24 enter into the cross dichroic prism 25. This prism is formed by bonding four rectangular prisms to each other, so that a dielectric multilayer film for reflecting red light and a dielectric multilayer film for reflecting blue light are formed in the inner face thereof in a cross shape. By these dielectric multilayer films, three colored lights are combined to form beams representing a color image. The combined beams are projected onto a screen 27 by the projection lens 26, being a projection optical system, and an enlarged image is displayed.

The driving method for the projection type liquid crystal display 30 of this embodiment will be described below.

Figure 10:
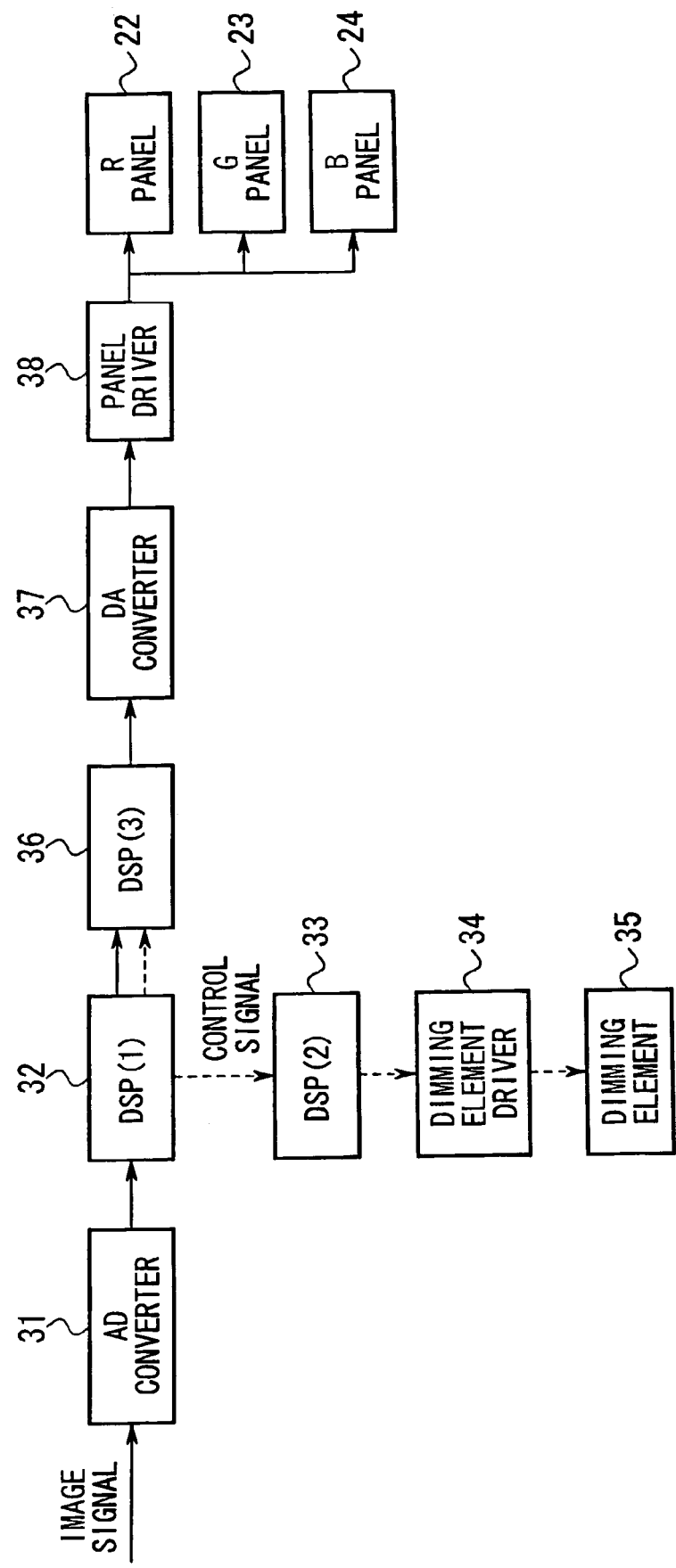
FIG. 10 is a block diagram showing the construction of a driving circuit of the projection type liquid crystal display in the first embodiment of the present invention.

FIG. 10 is a block diagram showing the construction of a driving circuit of the projection type liquid crystal display 30 of this embodiment. In the case of a conventional projection type liquid crystal display having no dimming function, the input image signal is directly supplied to a liquid crystal panel driver through suitable correction processing. In the case of this embodiment having a dimming function and controlling it based on the image signal, a circuit such as DSP (1) to DSP (3), being a digital signal processing block, becomes necessary as a basic construction, as described below.

In this embodiment, as shown in FIG. 10, the image signal input as an analog signal is input to the DSP (1) 32 (control signal determination device), being a first digital signal processing circuit, through an AD converter 31. The DSP (1) 32 determines a brightness control signal from the image signal. The DSP (2) 33 (dimming control device) controls a dimming element driver 34 based on the brightness control signal, and finally, the dimming element driver 34 actually drives a dimming element 35 (in this embodiment, the shading plate 5).

On the other hand, the brightness control signal determined by the DSP (1) 32 is also input to the DSP (3) 36 (image signal extension device), together with the image signal. The DSP (3) 36 extends the image signal to a suitable gradation range, based on the brightness control signal. The image signal after the extension processing, is converted again to the analog signal by a DA converter 37, and supplied from a panel driver 38 to the liquid crystal light valve for the red color 22 (R panel in FIG. 10), the liquid crystal light valve for the green color 23 (G panel in FIG. 10), and the liquid crystal light valve for the blue color 24 (B panel in FIG. 10), respectively.

As for the control method of the lighting apparatus 1, there can be considered (1) display image adaptive control, (2) control by projection enlargement ratio and (3) external control. The respective methods will be described below.

(1) Display Image Adaptive Control

At first, a case is considered where the display image adaptive control, that is, a brightness control suitable for the display image is carried out, such that in a bright image scene, the amount of light increases, and in a dark scene, the amount of light decreases. In this case, as described above, the DSP (1) 32 determines the brightness control signal based on the image signal. For this method, there can be considered, for example, three methods as described below.

(a) Method in Which a Gradation Having Maximum Brightness, of the Pixel Data Included in an Observed Frame, is Designated as a Brightness Control Signal.

Figure 11A:
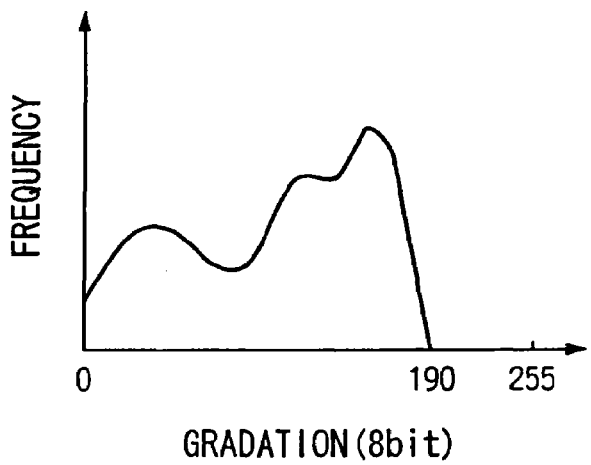
FIGS. 11A and 11B are diagrams for explaining a first method of determining a brightness control signal from an image signal, in the projection type liquid crystal display according to the first embodiment of the present invention.

For example, an image signal including gradations of 256 steps, from 0 to 255, is assumed. It is assumed that when an optional frame constituting continuous images is observed, the frequency distribution (histogram) for each gradation of the pixel data included in this frame shows a curve as shown in FIG. 11A. In the case of this graph, since the brightest gradation included in the histogram is 190, this gradation 190 is designated as the brightness control signal. This method can express the brightness most faithfully, with respect to the input image signal.

Figure 12:
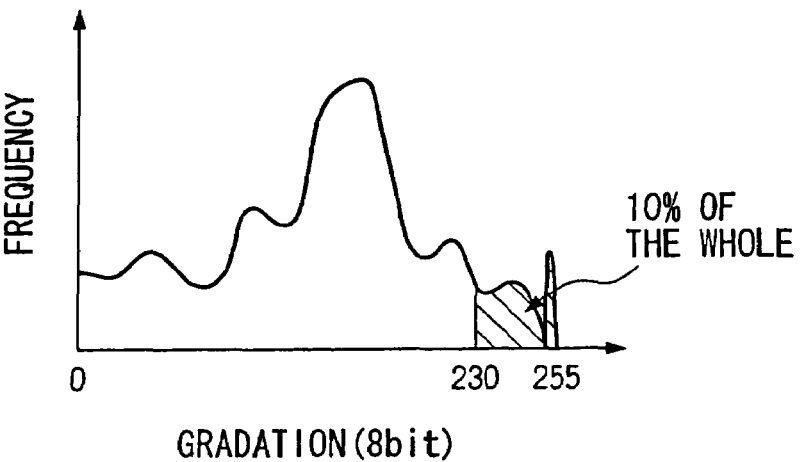
FIG. 12 is a diagram for explaining a second method in the first embodiment of the present invention.

(b) Method in Which a Gradation of a Certain Proportion (for Example, 10%) with Respect to the Frequency from the Maximum Brightness, from the Frequency Distribution (Histogram) for Each Gradation Included in the Observed Frame, is Designated as a Brightness Control Signal For example, when the frequency distribution of an image signal is as shown in FIG. 12, an area of 10% is taken from the histogram from the brightest side. If it is assumed that the gradation corresponding to 10% is 230, this gradation 230 is designated as the brightness control signal. As with the histogram shown in FIG. 12, when there is a sudden peak in the vicinity of the gradation 255, if the above method (a) is adopted, the gradation 255 is designated as the brightness control signal. However, this sudden peak portion does not have much meaning as the information for the whole screen. On the other hand, this method in which the gradation 230 is designated as the brightness control signal can be said to be a method of judging the brightness control signal by an area having a meaning as information for the whole screen. The proportion may be changed in the range of from about 2 to 50%.

Figures 13, 14:
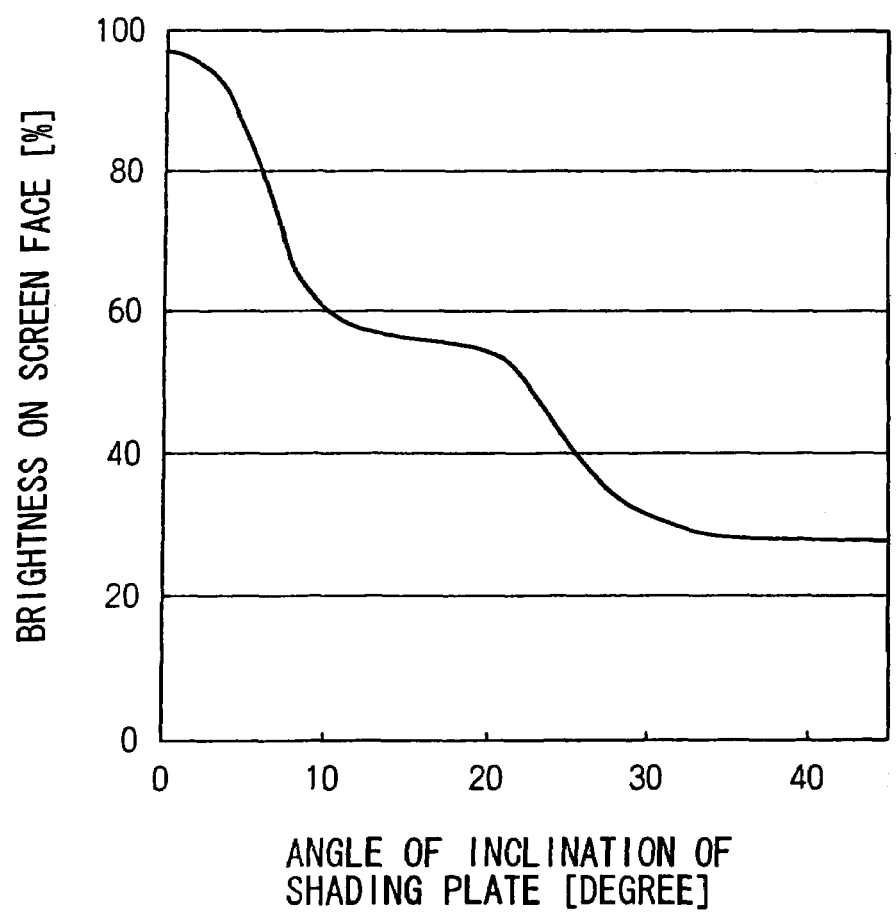
FIG. 13 is a diagram for explaining a third method in the first embodiment of the present invention.
FIG. 14 is a diagram showing the result of evaluation of the dimming function of the projection type display, being an example of the present invention.

(c) Method in Which a Screen is Divided Into a Plurality of Blocks, a Mean Value of Gradations in Pixels Included in Each Block is Determined, and the Largest Value is Designated as the Brightness Control Signal For example, as shown in FIG. 13, a screen is divided into m×n blocks, a mean value of brightness (gradations) is calculated for each block, block $A_{11}, \ldots, A_{mn}$, and the largest value is designated as the brightness control signal. It is desirable that the division number of the screen is from about 6 to 200. This method is one which can control the brightness, without detracting from the feeling of the whole screen.

In the above methods (a) to (c), the judgment of the brightness control signal can be performed with respect to the whole display area, or the above methods may be applied only to a particular portion, for example, the central portion of the display area. In this case, control becomes possible so as to determine the brightness from a portion viewed by an audience.

The DSP (2) 33 controls the dimming element driver 34 based on the brightness control signal determined by the above methods. As this method, there can be considered the following three methods.

(a) Control Method in Real Time, Corresponding to the Output Brightness Control Signal In this case, since the brightness control signal output from the DSP (1) 32 is directly supplied to the dimming element driver 34, the signal processing in the DSP (2) 33 is not necessary. This method is ideal in view of completely following the image brightness. However, the contrast of the screen may change in a short cycle depending on the image content, causing a problem in that the audience may feel unnecessary stress at the time of viewing.

(b) Method in Which an LPF (Low-Pass Filter) is Applied to the Output Brightness Control Signal, and Control is Carried Out by the Output Thereof For example, the changed portion of the brightness control signal of 1 to 30 seconds is cut by the LPF, and the output thereof is used for the control. According to this method, the changed portion for very short times is cut, and hence a change in contrast in the above short cycle can be avoided.

(c) Method of Detecting a Changeover Edge in the Brightness Control Signal

The dimming element 34 is controlled only when there is a change larger than a predetermined size (for example, at least 60 gradations) in the brightness control signal. According to this method, it is possible to perform control corresponding to only a changeover of scenes.

In this manner, for example, when gradation 190 is determined as the brightness control signal, and if it is assumed that the amount of light of the maximum brightness (gradation 255) is 100%, the dimming element 35 is driven so that an amount of light of 190/255=75% can be obtained. In this embodiment, the dimming element 35 is actually the shading plate 5. Therefore, the shading plate 5 is rotated so that the transmittance becomes 75% (shading rate is 25%). Similarly, when the gradation 230 is designated as the brightness control signal, the dimming element 35 is driven so that an amount of light of 230/250=90% can be obtained.

Figure 11B:
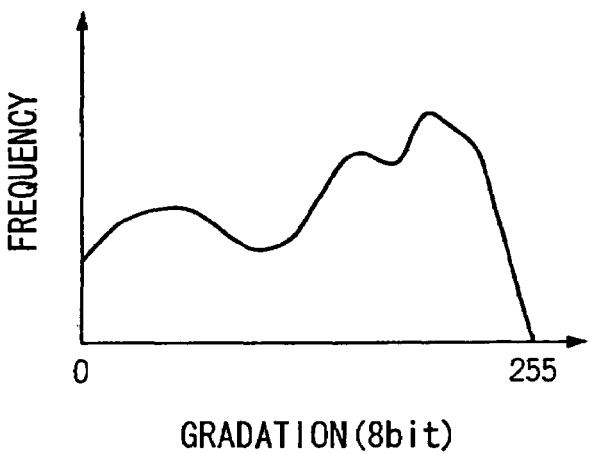

On the other hand, the DSP (3) 36 extends the image signal to a suitable gradation range, based on the brightness control signal determined by the DSP (1) 32 and the image signal. For example, when the image signal is extended up to the maximum gradation range, in the above example, since the displayable maximum gradation is 255, then when the brightness control signal is gradation 190 in the example of FIG. 11A, the image signal of gradations from 0 to 190 is extended to gradations from 0 to 255, as shown in FIG. 11B. By such a control of the illumination light amount and the extension processing of the image signal, a smooth gradation representation can be realized, while extending the dynamic range of the image.

(2) Control by Projection Enlargement Ratio

Control is carried out corresponding to zooming of the projection lens 26. Generally, since the amount of light per unit area in the liquid crystal light valve (area to be lighted) is constant, there is a tendency for the screen to become dark on the enlargement side, and become bright on the reduction side. Therefore, in order to correct this, the dimming element 35 is controlled such that when the projection lens 26 is changed to the enlargement side, the amount of light increases, and when the projection lens 26 is changed to the reduction side, the amount of light decreases.

(3) External Control

The dimming element 35 can be controlled by a user corresponding to his/her preference. For example, the dimming element 35 is controlled such that in a dark viewing environment, the amount of light decreases, and in a bright viewing environment, the amount of light increases. In this case, the construction may be such that the user uses a controller or directly operates the dimming element to carry out adjustment, or such that a brightness sensor is provided to automatically carry out the control. In order to carry out the control of (2) and (3), however, the circuits such as DSP (1) 32 to DSP (3) 36 in FIG. 10 are not necessary, but another circuit configuration is required.

[Lighting Apparatus-1]

The lighting apparatus in a first embodiment of the present invention will now be described, with reference to FIG. 1, FIG. 2A and FIG. 2B.

In this embodiment, an example of a lighting apparatus is shown in which a shading plate is inserted between two fly-eye lenses constituting the uniform lighting device. FIG. 1 is a side elevation view showing the schematic configuration of the lighting apparatus according to this embodiment. FIGS. 2A and 2B are respectively an elevation view showing the situation of a second fly-eye lens as seen from the shading plate side of the lighting apparatus.

Figure 1:
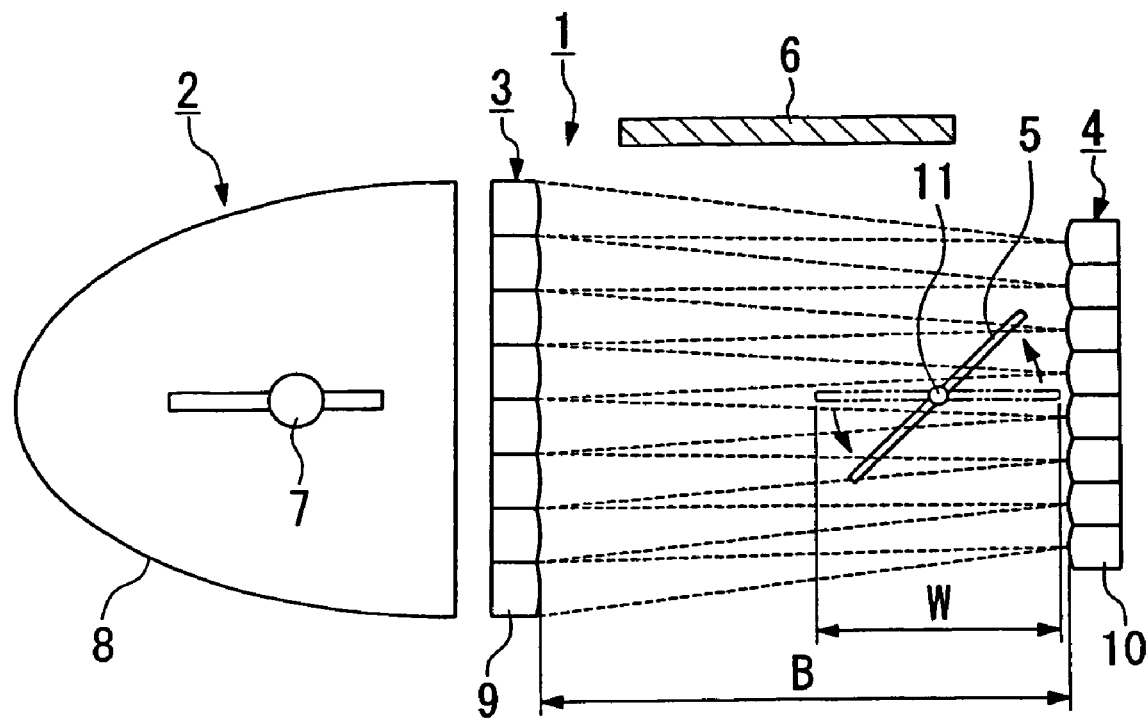
FIG. 1 is a side elevation view showing a schematic configuration of a lighting apparatus according to a first embodiment of the present invention.

The lighting apparatus 1 of this embodiment comprises, as shown in FIG. 1, a light source 2, fly-eye lenses 3 and 4, a shading plate 5 and a light absorbing body 6. The light source 2 comprises a lamp 7 such as a high-pressure mercury lamp, and a reflector 8 for reflecting the light of the lamp 7. Moreover, the first fly-eye lens 3 and the second fly-eye lens 4 are sequentially arranged from the light source 2 side. The respective fly-eye lenses 3 and 4 comprise a plurality of (in this embodiment, for example, 6×8) lenses 9 and 10, and serves as the uniform lighting device for equalizing the illuminance distribution of light emitted from the light source 2 in a liquid crystal light valve, being an area to be lighted.

As the dimming device for adjusting the amount of light emitted from the light source 2, one rectangular shading plate 5 is arranged rotatably between the first fly-eye lens 3 and the second fly-eye lens 4. The shading plate 5 is arranged in the vicinity of the second fly-eye lens 4 closer to the liquid crystal light valve, of the two fly-eye lenses 3 and 4. The width W of the shading plate 5 is set to less than half of a gap B between the two fly-eye lenses 3 and 4. A rotation shaft 11 extending horizontally is provided at the center of the shading plate 5. A driving device (not shown) such as a stepping motor is connected to the rotation shaft 11, so that the shading plate 5 can be rotated with high-speed response on receiving a drive signal from the dimming element driver 34.

Figure 2A:
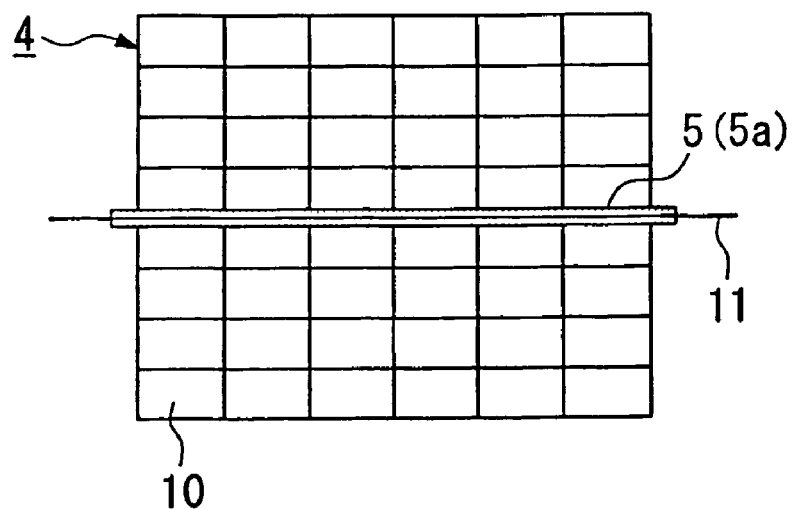
FIGS. 2A and 2B are respectively an elevation view showing the situation of a second fly-eye lens as seen from a shading plate side of the lighting apparatus according to the first embodiment of the present invention.
Figure 2B:
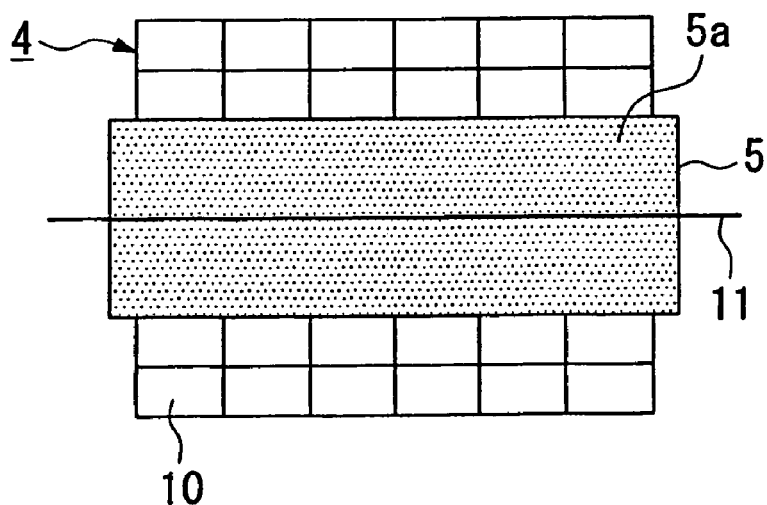

The rotation shaft 11 of the shading plate 5 is arranged, as shown in FIG. 2A, parallel to the horizontal arrangement direction of a plurality of lenses 10 constituting the second fly-eye lens 4, and along the boundary between adjacent lenses 10 (in FIG. 2A, between the fourth and fifth lenses from the top). The shading plate 5 comprises a material, for example, aluminum, steel, or stainless steel, and is formed such that in a rotated state, the side facing the light source 2 becomes a reflecting surface 5a, which reflects light emitted from the light source 2.

In FIG. 2A, the reflecting surface 5a is located parallel to the optical axis of the outgoing beam from the light source 2 (in FIG. 1, in a state where the outline of the shading plate 5 is shown by a two-dot chain line), so that the outgoing beam from the light source 2 is transmitted by 100% (in a state where no dimming is applied). On the other hand, in FIG. 2B, there is shown a situation in which the shading plate 5 is rotated so that the reflecting surface 5a faces the light source 2 from the state shown in FIG. 2A (in a stage where the outline of the shading plate 5 is shown by a solid line), so that the outgoing beam from the light source 2 is transmitted, for example, only by 30% (in a state where dimming is applied).

As shown in FIG. 1, the size of the shading plate 5 is set to give an angle such that if it is assumed that the desired minimum transmitted amount of light is 30%, when the shading plate 5 is inclined until this minimum transmitted amount of light can be obtained, the reflected light from the shading plate 5 does not return to the light source. At a position outside the two fly-eye lenses 3 and 4 where the reflected light from the shading plate reaches at all times, regardless of the degree of inclination of the shading plate 5, a light absorbing material 6 comprising a nonflammable material and having a low optical reflectance, such as asbestos, is arranged in order to absorb the reflected light.

According to the lighting apparatus 1 of this embodiment, the rotatable shading plate 5 is provided between the two fly-eye lenses constituting the uniform lighting device, and this shading plate 5 is rotated at a high speed, based on the image signal. Therefore, the amount of light is adjusted, for example, such that the amount of light increases in a situation where the image scene of the projection type display is bright, and the amount of light decreases in a situation where the image scene of the projection type display is dark. Thereby, illumination light having a brightness corresponding to the image can be obtained in the liquid crystal light valve, even if the optical output intensity of the light source 2 comprising a high-pressure mercury-vapor lamp, in which control of the optical output intensity is difficult, is constant, thereby contributing to an extension of the dynamic range of the projection type display.

Since the shading plate 5 is arranged on the side close to the second fly-eye lens 4, extinction is carried out at a portion where the beams of light are narrowed down. Hence, dimming can be carried out without affecting the illuminance distribution at the position of the liquid crystal light valve. Moreover, since the rotation shaft of the shading plate 5 is arranged along the boundary of the plurality of lenses 10 constituting the second fly-eye lens 4, then in the state of 100% transmission as shown in FIG. 2A, the light is hardly cut off. Therefore, even in the construction where the shading plate 5 is inserted between the two fly-eye lenses 3 and 4, the brightness does not drop when dimming is not performed.

Furthermore, in this embodiment, the shading plate 5 having optical reflectivity is used. However, since it is constructed such that the desired minimum transmitted amount of light can be obtained with an angle such that the reflected light from the shading plate 5 does not return to the light source 2, the situation where the reflected light scatters unnecessarily or interferes to thereby adversely affect the display can be prevented. Moreover, since the light absorbing material 6 is provided at a position where the reflected light from the shading plate 5 reaches even when an other constituent of the lighting apparatus is arranged at the position where the reflected light from the shading plate 5 reaches, the situation where the temperature of the constituent increases to cause a problem can be avoided.

[Lighting Apparatus-2]

Figure 3A:
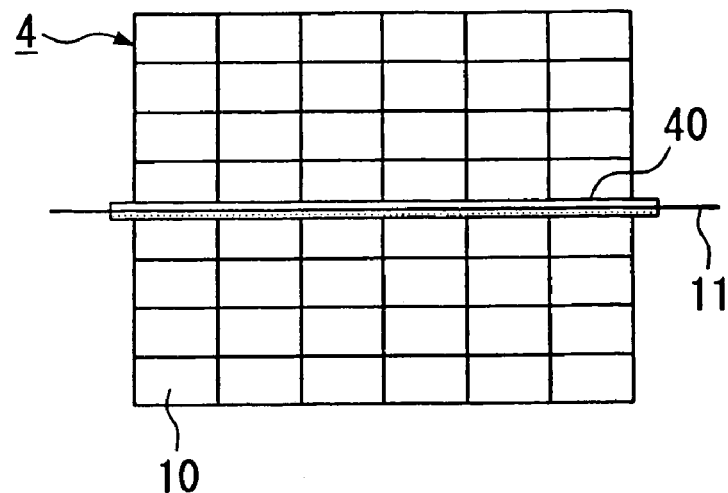
FIGS. 3A and 3B are respectively an elevation view showing the situation of a second fly-eye lens as seen from a shading plate side of a lighting apparatus according to a second embodiment of the present invention.
Figure 3B:
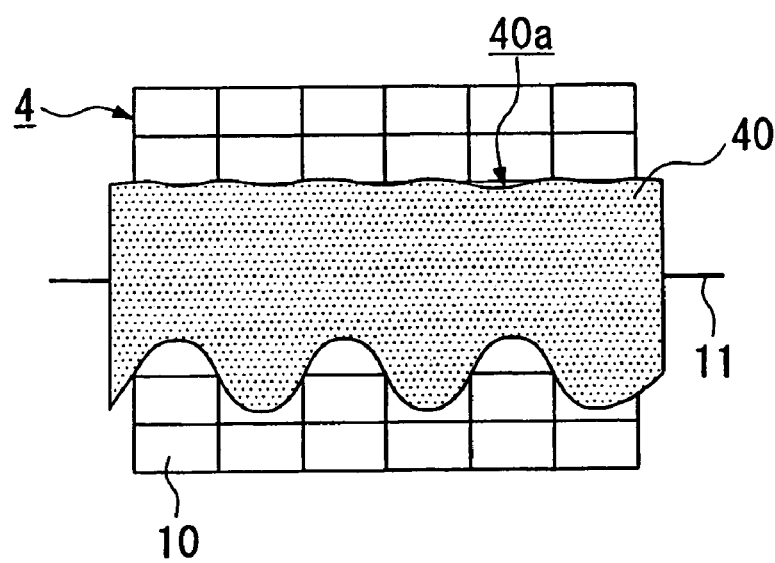

A lighting apparatus according to a second embodiment of the present invention will be described with reference to FIGS. 3A and 3B.

The basic construction of the lighting apparatus of this embodiment is the same as that of the first embodiment, and only the shape of the shading plate is different. Therefore, in this embodiment, only the shape of the shading plate is described, using FIGS. 3A and 3B, and the description for the common parts is omitted. FIG. 3A shows a state of 100% transmission (a state in which dimming is not applied), and FIG. 3B shows a state of 30% transmission (a state in which dimming is applied).

In the case of the first embodiment, the shape of the shading plate 5 is rectangular, and the upper and lower edges are formed linear. In this embodiment, however, as shown in FIG. 3B, the shape of the shading plate 40 is substantially rectangular, but a corrugation 40a is added so that the upper and lower edges become wavy irregularly. Moreover corrugation is designed so that the side close to the first fly-eye lens becomes particularly large, in the state with shading being performed.

When the shading plate 40 of this embodiment is provided, since shading is performed in a random distribution with respect to each of the plurality of secondary light source images created by the first fly-eye lens 3, an image obtained by superimposing these images has a uniform illuminance distribution due to blending of these distributions, and hence the uniformity of illuminance at the position of the liquid crystal light valve can be improved. Moreover, a larger effect can be obtained by having such a structure on the side close to the first fly-eye lens 3, which forms secondary light source images. Since the light emitted from the lamp has a centrosymmetric distribution with respect to the optical axis, the effect can be increased by designing the corrugation as described above.

The means for performing shading at a random distribution to obtain the above effect includes; adding the corrugation to the shading plate, forming holes having different sizes and densities from the end of the shading plate, or partially providing areas having a different optical transmittance.

[Lighting Apparatus-3]

Figure 4A:
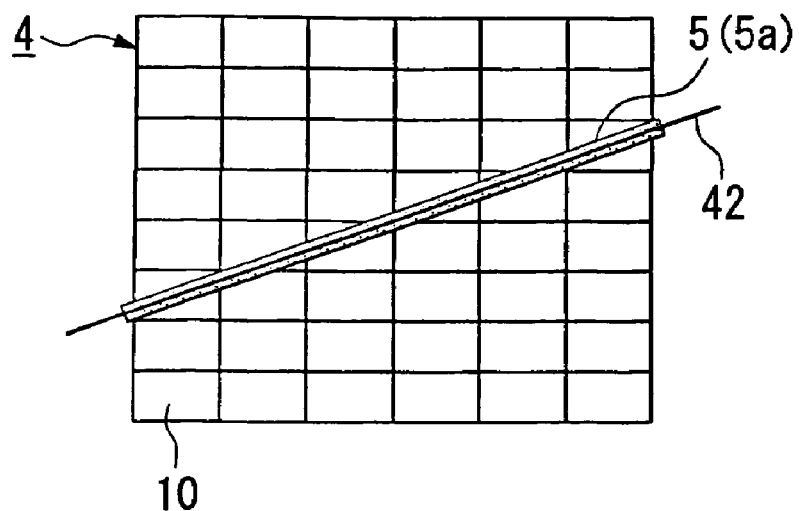
FIGS. 4A and 4B are respectively an elevation view showing the situation of a second fly-eye lens as seen from a shading plate side of a lighting apparatus according to a third embodiment of the present invention.
Figure 4B:
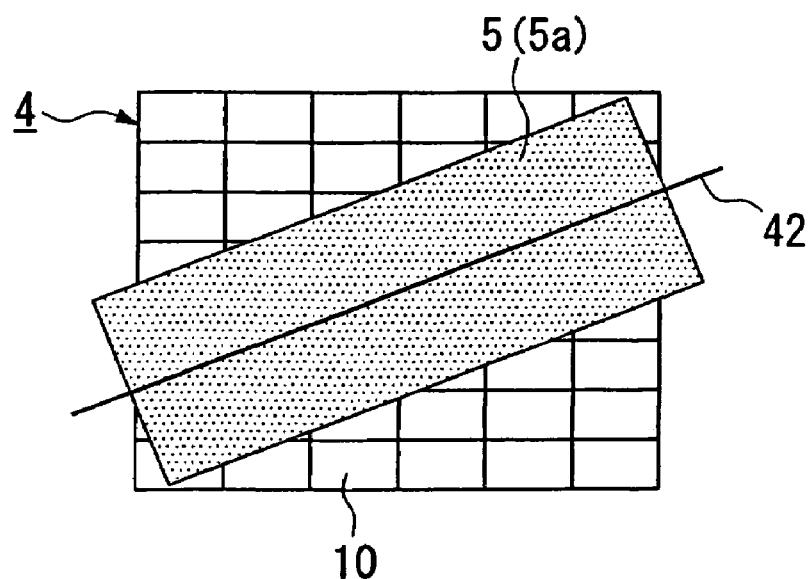

A lighting apparatus according to a third embodiment of the present invention will be described with reference to FIGS. 4A and 4B.

The basic construction of the lighting apparatus of this embodiment is the same as that of the first and second embodiments, and only the arrangement of the rotation shaft of the shading plate is different. Therefore, in this embodiment, only the construction of the shading plate is described, using FIGS. 4A and 4B, and the description for the common parts is omitted. FIG. 4A shows a state of 100% transmission (the state in which dimming is not applied), and FIG. 4B shows a state of 30% transmission (the state in which dimming is applied).

In the case of the first embodiment, the rotation shaft 11 of the shading plate 5 is arranged so as to be parallel with the arrangement direction of the plurality of lenses 10 of the second fly-eye lens 4, and to follow the boundary of the lenses 10. However, in this embodiment, as shown in FIGS. 4A and 4B, the rotation shaft 42 of the shading plate 5 is inclined with respect to the arrangement direction of the plurality of lenses 10, and is arranged so as to cross each lens 10 without following the boundary of the lenses 10.

As in the first and second embodiments, when the rotation shaft 11 of the shading plate 5 is arranged so as to match with the boundary of the plurality of lenses 10 of the second fly-eye lens 4, there is the effect that the brightness does not decrease when dimming is not applied. However, as in this embodiment, when the rotation shaft 42 of the shading plate 5 is inclined with respect to the arrangement direction of the plurality of lenses 10 of the second fly-eye lens 4, there is a place where the rotation shaft 42 crosses the center of the lens 10, and hence there is concern that the brightness may decrease slightly, even if dimming is not applied. On the other hand, in this construction, as shown in FIG. 4B, shading is performed in different areas depending on the lens (in FIG. 4B, the shape of the triangular portion of the lens facing the other side of the shading plate 5 is different depending on the lens), as in the second embodiment where a corrugation is added to the edge of the shading plate. Therefore, when the images are superimposed, the illuminance distribution is equalized, and hence the uniformity of illuminance at the position of the liquid crystal light valve can be further improved.

[Lighting Apparatus-4]

A lighting apparatus according to a fourth embodiment of the present invention will be described with reference to FIG. 5.

This embodiment has also a common point with the first to the third embodiments in that the shading plate is inserted between two fly-eye lenses. The different point is that in the above embodiments, one shading plate is used, but in this embodiment a plurality of shading plates is used.

Figure 5:
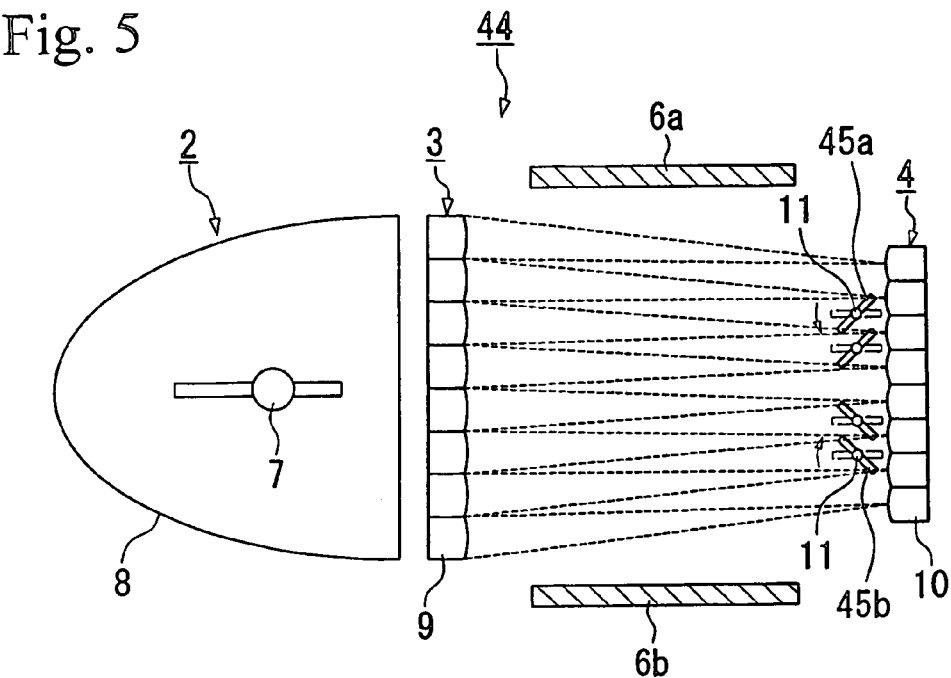
FIG. 5 is a side elevation view showing a schematic configuration of a lighting apparatus according to a fourth embodiment of the present invention.

FIG. 5 is a side elevation view showing a schematic configuration of the lighting apparatus of this embodiment. In FIG. 5, common constituents to those in FIG. 1 are denoted by the same reference symbols, and detailed description thereof is omitted.

In the lighting apparatus 44 of this embodiment, as shown in FIG. 5, a plurality of shading plates 45a and 45b is rotatably arranged between the first fly-eye lens 3 and the second fly-eye lens 4, matched with a plane perpendicular to the optical axis. The plurality of shading plates 45a and 45b is arranged in the vicinity of the second fly-eye lens 4, and the width of each of the shading plates 45a and 45b is set to be equal to or less than the width of each lens 10. A rotation shaft 11 extending horizontally is provided at the center of each shading plate 45a, 45b, and the rotation shaft 11 of each shading plate 45a, 45b is respectively arranged, matched with the boundary of the lenses 10. A drive device such as a stepping motor is connected to the rotation shaft 11 to separately rotate the shading plates 45a and 45b. The construction may be such that each shading plate is associated with each other and rotated all at once with the same angle, or only a part of the shading plates rotates, or the shading plates are rotated with different rotation angles.

In FIG. 5, four shading plates 45a, 45b are shown, and the upper two shading plates 45a and the lower two shading plates 45b rotate in the opposite direction to each other. That is to say, the shading plates 45a and 45b, being two each on the upper and lower sides, rotate symmetrically about the optical axis of the outgoing beam from the light source 2, so that their reflecting surfaces face outwards, the upper two shading plates 45a rotating counterclockwise in FIG. 5, and the lower two shading plates 45a rotating clockwise in FIG. 5. In other words, shading is carried out in linear symmetry (up-down symmetry) with respect to an axis passing through the center of the whole second fly-eye lens 4 (with respect to an axis extending perpendicular to the page in FIG. 5), by the four shading plates 45a and 45b. The size and the number of the shading plates 45a and 45b are set so as to have an angle such that when the shading plates 45a and 45b are inclined until a desired minimum transmitted amount of light can be obtained, the reflected light from the shading plates 45a and 45b does not return to the light source 2. A light absorbing material 6a for absorbing the reflected light from the upper two shading plates 45a, and a light absorbing material 6b for absorbing the reflected light from the lower two shading plates 45b are arranged, at a position outside of the two fly-eye lenses 3 and 4 where the reflected light from the shading plates 45a and 45b reaches.

In this embodiment, by arranging the plurality of shading plates 45a and 45b, the size of each shading plate can be reduced. As a result, dimming can be carried out, while reducing the influence on the illuminance distribution at the position of the liquid crystal light valve. When a small shading plate is used, it can be inserted between the first and second fly-eye lenses, without changing the arrangement of the existing first fly-eye lens and second fly-eye lens, and hence the lighting apparatus does not become large. Particularly in this embodiment, since the width of each of the shading plates 45a and 45b is set to be equal to or less than the width of each lens 10, the size of the shading plate can be made sufficiently small, and hence the above effect can be reliably obtained.

As described above, the plurality of shading plates 45a and 45b may be rotated all at once with the same angle. However, if a construction in which only a part of the shading plates is rotated and the remaining shading plates are left to stand still, or a construction in which a plurality of shading plates is rotated with different rotation angles, or a construction combining these is employed, more delicate dimming can be carried out.

Moreover, since shading is carried out in linear symmetry with respect to an axis passing through the center of the whole second fly-eye lens 4, by the four shading plates 45a and 45b, the illuminance distribution at the liquid crystal light valve becomes linearly symmetrical with respect to an axis passing through the center of the liquid crystal light valve. Therefore, even if the beams after having passed through the second fly-eye lens 4 have a slight illuminance distribution, the illuminance distribution is equalized by superimposing the beams by the liquid crystal light valve. When the lighting apparatus 44 of this embodiment is used for a projection type liquid crystal display, in which only an image corresponding to the blue color is reversed with respect to the images of the other two colors, in the vertical direction or in the horizontal direction of the image, an image in which the color balance is uniform at the opposite sides of the screen 27 can be reproduced.

[Lighting Apparatus-5]

A lighting apparatus according to a fifth embodiment of the present invention will be described with reference to FIG. 6.

The different point in this embodiment from the lighting apparatus in the first to fourth embodiments in which the shading plate is inserted between the two fly-eye lenses, is that the shading plate is inserted between the light source and the first fly-eye lens.

Figure 6:
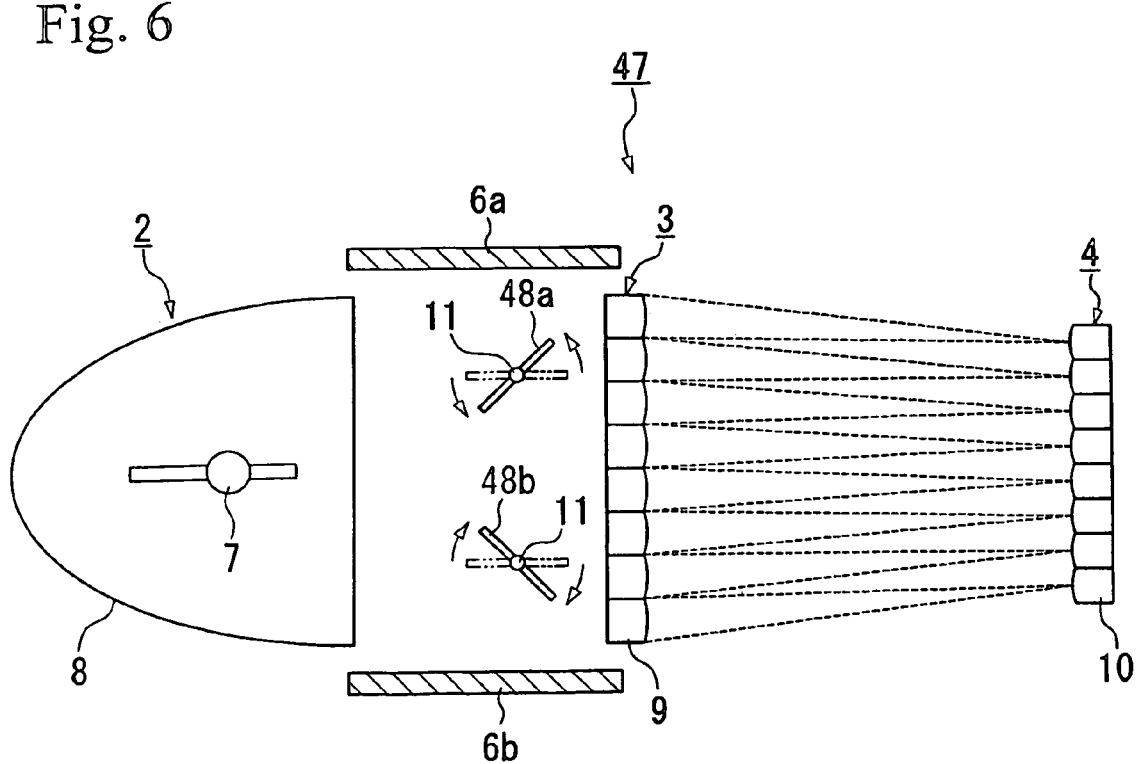
FIG. 6 is a side elevation view showing a schematic configuration of a lighting apparatus according to a fifth embodiment of the present invention.

FIG. 6 is a side elevation view showing a schematic configuration of a lighting apparatus of this embodiment. In FIG. 6, common constituents to those in FIG. 1 are denoted by the same reference symbols, and detailed description thereof is omitted.

In the lighting apparatus 47 of this embodiment, as shown in FIG. 6, a plurality of shading plates 48a and 48b is rotatably arranged between the light source 2 and the first fly-eye lens 3, along a plane perpendicular to the optical axis. A rotation shaft 11 extending horizontally is provided at the center of each shading plate 48a, 48b, and the rotation shaft 11 of each shading plate 48a, 48b is respectively arranged, matched with the boundary of the lenses 9. A drive device such as a stepping motor is connected to the rotation shaft 11 to separately rotate the shading plates 48a and 48b. The construction may be such that each of the shading plates 48a and 48b is associated with each other and rotated all at once with the same angle, or only the shading plates on one side rotate, or the shading plates are rotated with different rotation angles.

In FIG. 6, two shading plates 48a and 48b are shown, and the upper shading plate 48a and the lower shading plate 48b rotate in the opposite direction to each other. That is to say, the upper and lower shading plates 48a and 48b rotate symmetrically about the optical axis of the outgoing beam from the light source 2, so that their reflecting surfaces face outwards, the upper shading plate 48a rotating counterclockwise in FIG. 6, and the lower shading plate 48a rotating clockwise in FIG. 6. The angle of the shading plates 48a and 48b is set such that when the shading plates 48a and 48b are inclined until a desired minimum transmitted amount of light can be obtained, the reflected light from the shading plates 48a and 48b does not return to the light source 2. A light absorbing material 6a for absorbing the reflected light from the upper shading plate 48a, and a light absorbing material 6b for absorbing the reflected light from the lower shading plate 48b are arranged, at a position where the reflected light from the shading plates 48a and 48b reaches.

In the lighting apparatus 47 of this embodiment, the shading plates 48a and 48b are arranged between the light source 2 and the first fly-eye lens 3. Therefore, the size of the lighting apparatus may be increased, according to circumstances. On the other hand, since the illuminance distribution of the light source 2 is relatively large, from the beginning, there will be no large influence, even if the shading plates 48a and 48b are inserted between the light source 2 and the first fly-eye lens 3. If anything, since the shading plate is not required between the first fly-eye lens 3 and the second fly-eye lens 4, the illuminance distribution at the position of the liquid crystal light valve can be made small.

If such a construction is employed where a part of shading plates of the plurality of shading plates 48a and 48b is rotated, or the plurality of shading plates are rotated with difference angles, more delicate dimming can be performed. Moreover, the construction in which the plurality of shading plates 48a and 48b is rotated in the opposite direction, and the effect of arranging the light absorbing materials 6a and 6b at the position where the reflected light from the shading plates 48a and 48b reaches are the same as in the above embodiments.

[Lighting Apparatus-6]

A lighting apparatus according to a sixth embodiment of the present invention will be described with reference to FIG. 7 and FIG. 8.

This embodiment also shows an example in which the shading plate is inserted between the light source and the first fly-eye lens, as in the fifth embodiment, but the different point is that a plurality of shading plates are rotated integrally.

Figure 7:
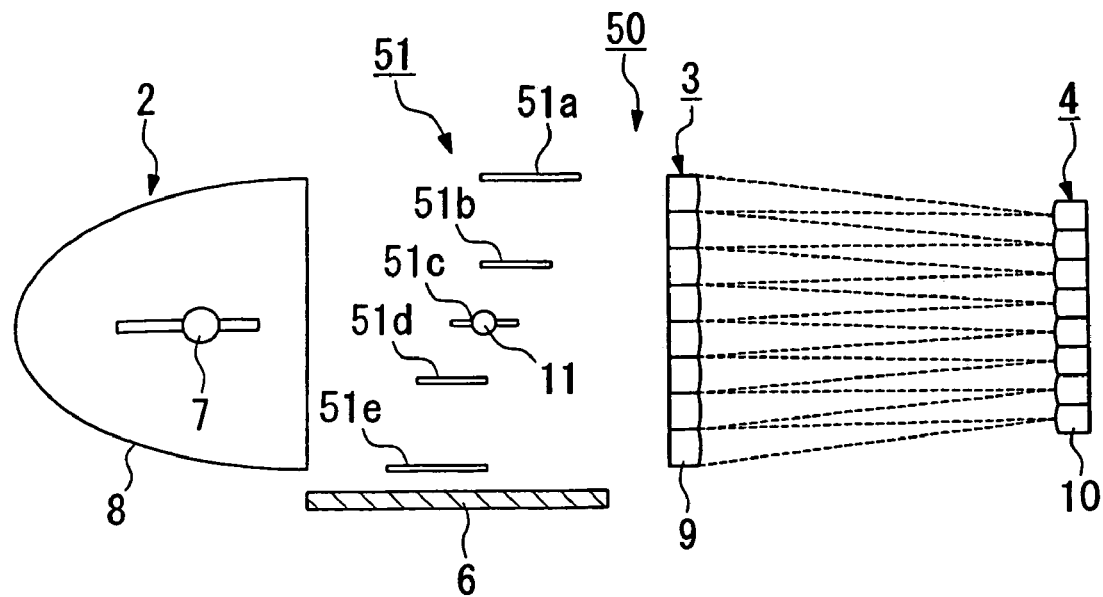
FIG. 7 is a side elevation view showing a schematic configuration of a lighting apparatus according to a sixth embodiment of the present invention.
Figure 8:
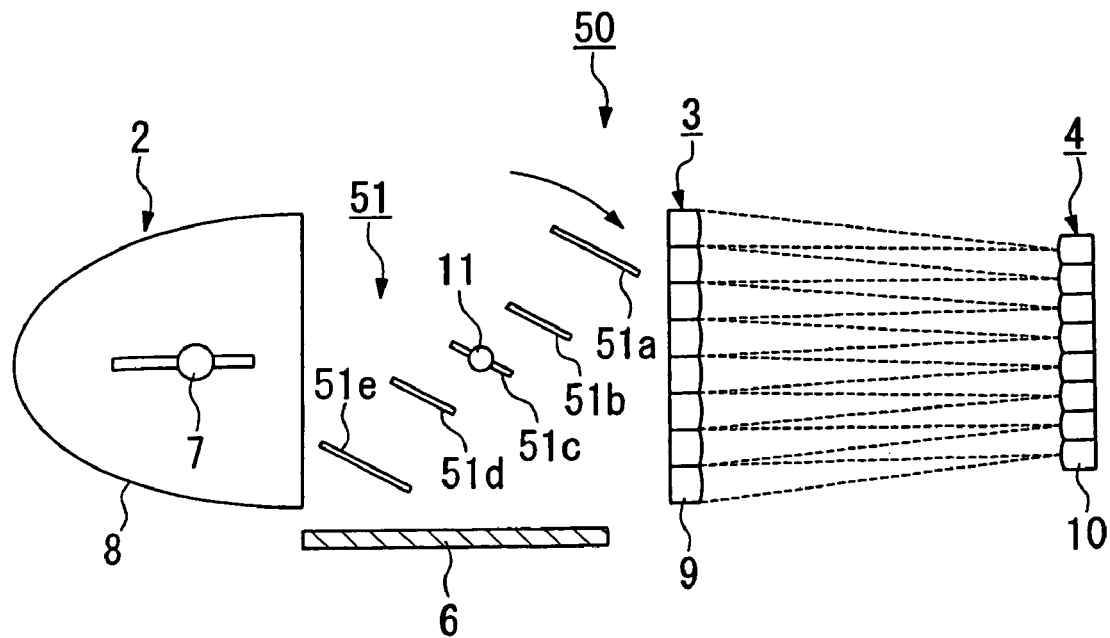
FIG. 8 is a side elevation view of the sixth embodiment of the present invention.

FIG. 7 and FIG. 8 are side elevation views showing a schematic configuration of a lighting apparatus according to this embodiment, FIG. 7 showing a state of 100% transmission (a state in which dimming is not applied), and FIG. 8 showing a state of 30% transmission (a state in which dimming is applied). In FIG. 7 and FIG. 8, common constituents to those of FIG. 1 are denoted by the same reference symbols, and detailed description thereof is omitted.

In the lighting apparatus 50 of this embodiment, as shown in FIG. 7 and FIG. 8, a plurality of shading plates 51a to 51e are arranged along a plane perpendicular to the optical axis, between the light source 2 and the first fly-eye lens 3. In the fifth embodiment, the rotation shaft is provided for each shading plate, and each shading plate is separately rotated. On the other hand, in this embodiment, the plurality of shading plates 51a to 51e are integrally rotated clockwise in the figure, about one rotation shaft 11 connected to the central shading plate 51c. The size and the pitch of the individual shading plate 51a to 51e are not equal, and are different depending on the location. A light absorbing material 6 is arranged for absorbing the reflected light, at a position where the reflected light from the shading plates 51a to 51e reaches.

According to the construction of this embodiment, even if the number of the shading plates 51a to 51e is plural, only one rotation shaft and one rotation mechanism are required, and hence the apparatus configuration can be simplified. Moreover, the design of the whole shading plates can be optimized, by making the size and pitch of the individual shading plate 51a to 51e different depending on the location. As a result, the illuminance distribution at the position of the liquid crystal light valve can be favorably maintained.

[Lighting Apparatus-7]

Figure 15:
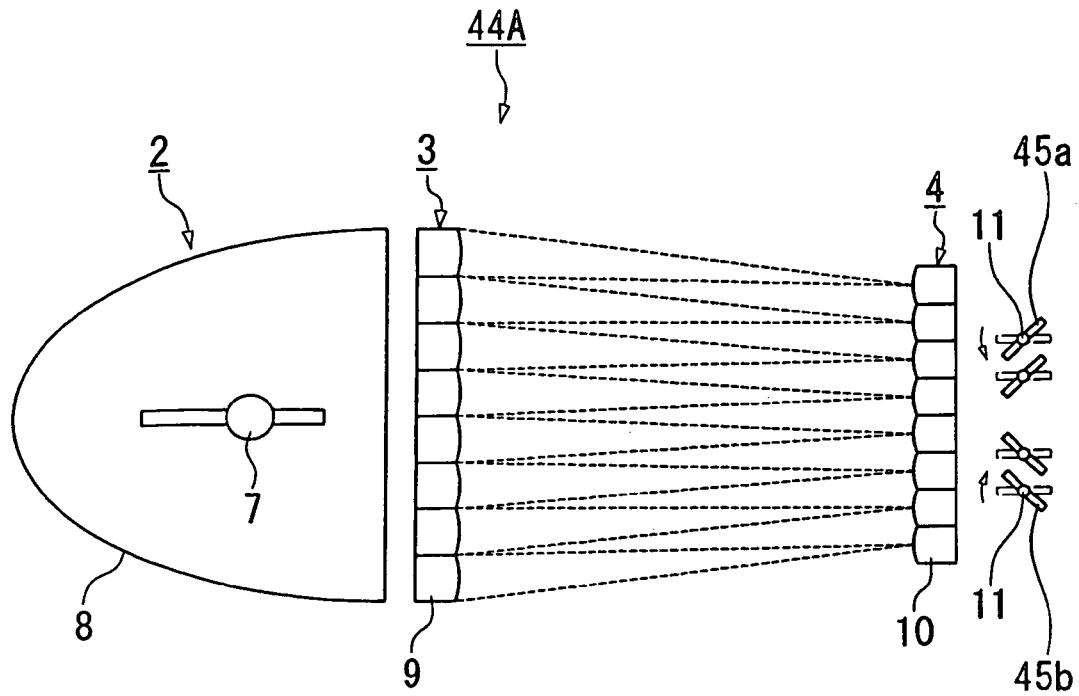
FIG. 15 is a side elevation view showing a schematic configuration of a lighting apparatus according to a seventh embodiment of the present invention.

A lighting apparatus according to a seventh embodiment of the present invention will be described with reference to FIG. 15. The configuration of the lighting apparatus of this embodiment is substantially the same as that of the fourth embodiment shown in FIG. 5. FIG. 15 is a side elevation view showing a schematic configuration of the lighting apparatus of this embodiment. In FIG. 15, common constituents to those in FIG. 5 are denoted by the same reference symbols, and detailed description thereof is omitted.

In the case of the lighting apparatus 44 of the fourth embodiment, the plurality of shading plates 45a and 45b is arranged between the first fly-eye lens 3 and the second fly-eye lens 4. However, in the lighting apparatus 44A of this embodiment, as shown in FIG. 15, a plurality of shading plates 45a and 45b is arranged rotatably on the outgoing side of the second fly-eye lens 4, matched with a plane perpendicular to the optical axis. The plurality of shading plates 45a and 45b is arranged in the vicinity of the second fly-eye lens 4, and the width of each of the shading plates 45a and 45b is set to be equal to or less than the width of each lens 10. The point that the rotation shaft 11 extending horizontally is provided at the center of each shading plate 45a, 45b, and the rotation shaft 11 of each shading plate 45a, 45b is respectively arranged, matched with the boundary of the lenses 10 is the same as in the fourth embodiment. In FIG. 15, four shading plates 45a and 45b are shown, and the upper two shading plates 45a and the lower two shading plates 45b rotate in the opposite direction to each other. In other words, shading is carried out in linear symmetry (up-down symmetry) with respect to an axis passing through the center of the whole second fly-eye lens 4 (with respect to an axis extending perpendicular to the page in FIG. 5), by the four shading plates 45a and 45b.

In this embodiment, since the size of the respective shading plates can be made small by arranging the plurality of shading plates 45a and 45b, the same effects as those of the fourth embodiment can be obtained, that is: dimming can be performed, while reducing the influence thereof on the illuminance distribution at the position of the liquid crystal light valve; the shading plates 45a and 45b can be inserted, without changing the arrangement of the existing first fly-eye lens 3 and second fly-eye lens 4, and hence the lighting apparatus can be made small; the illuminance distribution is made symmetrical, and the appearance of the projected image is improved; and an image can be reproduced such that the color balance is uniform on the opposite sides of the screen.

[Lighting Apparatus-8]

A lighting apparatus according to an eighth embodiment of the present invention will be described with reference to FIG. 16 to FIG. 19B.

The basic construction of the lighting apparatus of this embodiment is the same as that of the first embodiment, but is different in that a PBS array, being the polarization converting element, is provided on the outgoing side of the second fly-eye lens. Also, it is different in that the shading plate is not a rotatable type as exemplified in the first to seventh embodiments, but is a sliding type.

Figure 16:
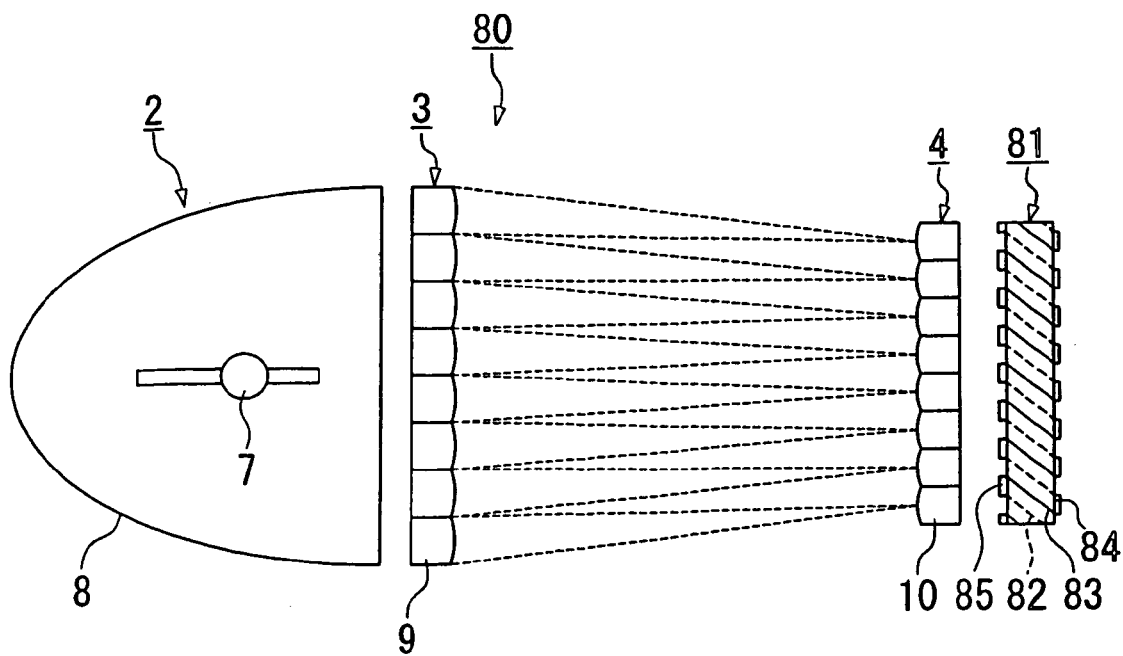
FIG. 16 is a side elevation view showing a schematic configuration of a lighting apparatus according to an eighth embodiment of the present invention.
Figure 17A:
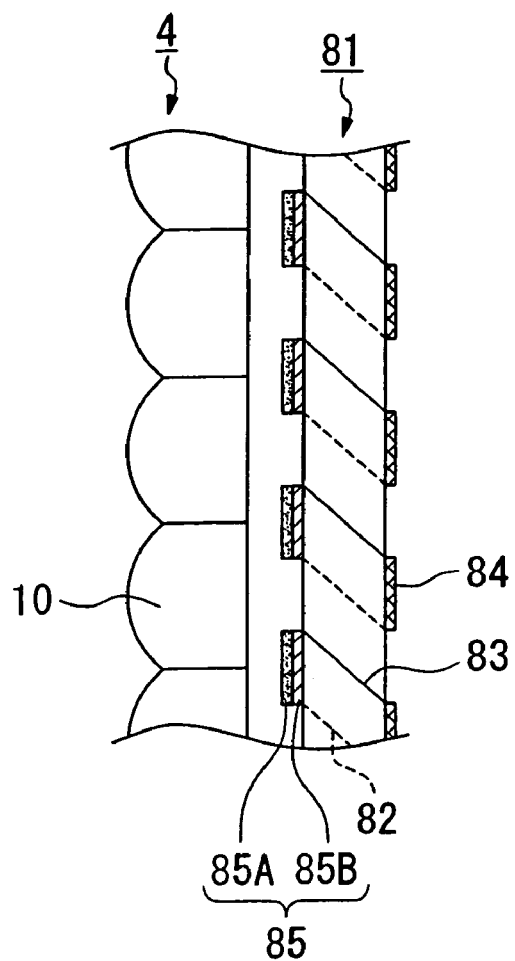
FIGS. 17A and 17B are enlarged plan views, showing a lighting apparatus according to the eighth embodiment of the present invention, taking out only the portion of a second fly-eye lens and a PBS array, FIG. 17A showing a state where dimming is not applied, and FIG. 17B showing a state where dimming is applied.
Figure 17B:
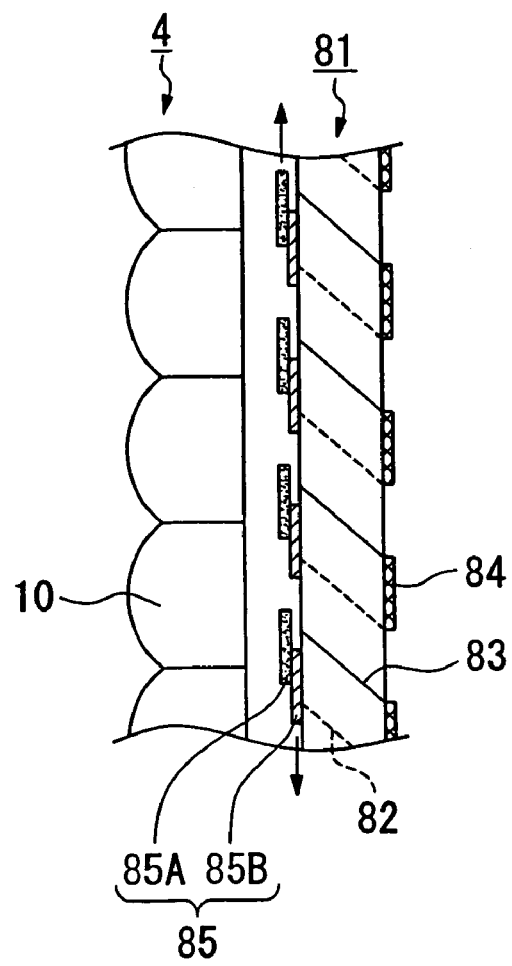
Figure 18A:
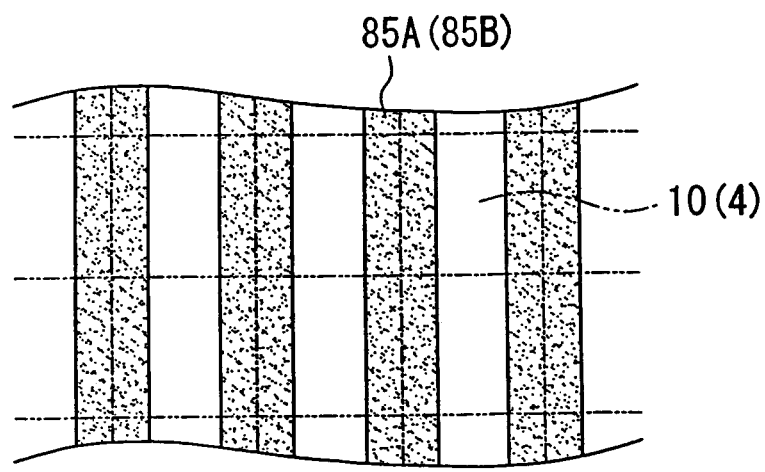
FIGS. 18A and 18B are elevation views of a shading plate in the lighting apparatus according to the eighth embodiment of the present invention, FIG. 18A showing a state where dimming is not applied, and FIG. 18B showing a state where dimming is applied.
Figure 18B:
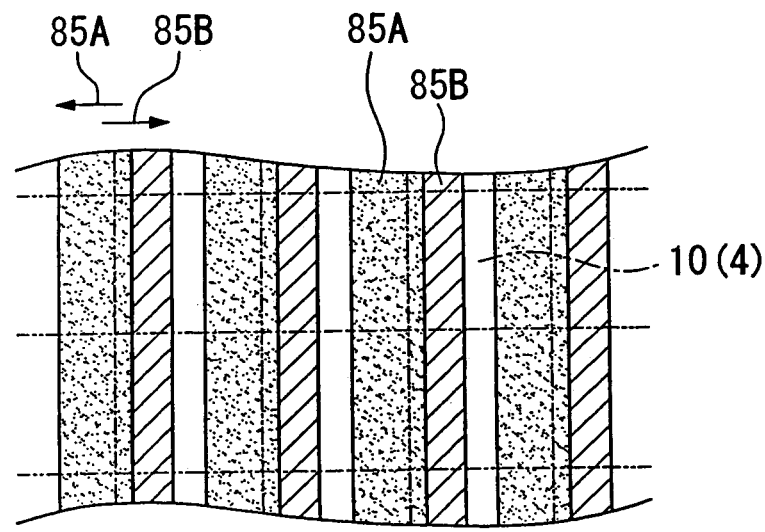
Figure 19A:
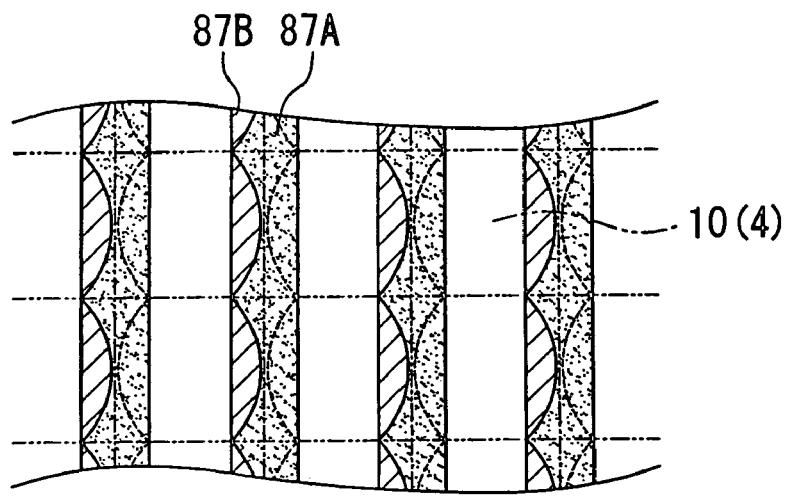
FIGS. 19A and 19B are elevation views showing another example of a shading plate according to the eighth embodiment of the present invention, FIG. 19A showing a state where dimming is not applied, and FIG. 19B showing a state where dimming is applied.
Figure 19B:
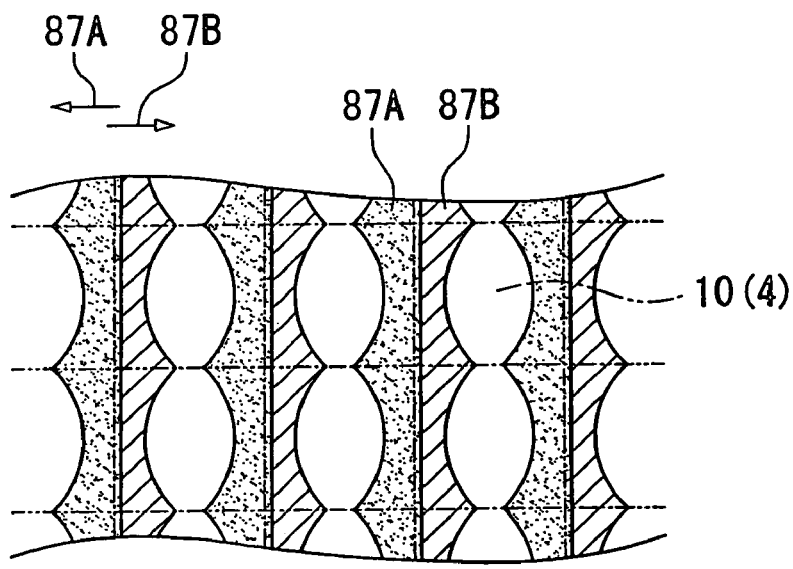

FIG. 16 is a plan view showing the schematic configuration of the lighting apparatus of this embodiment. In FIG. 16, common constituents to those in FIG. 1 are denoted by the same reference symbols, and detailed description thereof is omitted. FIG. 17A and FIG. 17B are enlarged plan views showing the lighting apparatus, taking out only the portion of the second fly-eye lens and the PBS array, and FIGS. 18A and 18B, and FIGS. 19A and 19B are respectively elevation views of the shading plate. FIG. 17A, FIG. 18A and FIG. 19A show a state where dimming is not applied, and FIG. 17B, FIG. 18B and FIG. 19B show a state where dimming is applied.

In the lighting apparatus 80 of this embodiment, as shown in FIG. 16, FIG. 17A and FIG. 17B, the first fly-eye lens 3 and the second fly-eye lens 4 are sequentially arranged from the light source 2 side, and the PBS array 81 is arranged on the outgoing side of the second fly-eye lens 4. In the PBS array 81, a polarization separation film 82 and a reflection film 83 are alternately arranged, and a ½ wave plate 84 for converting a predetermined linearly polarized light into a linearly polarized light orthogonal thereto (for example, converting p polarization into s polarization) is provided on the outgoing side of the polarization separation film 82. The PBS array 81 is normally provided with a shading plate for preventing the outgoing beam from the light source 2 from directly entering into the reflection film 83. In this embodiment, however, a shading plate 85 serving as the dimming device of the present invention also fulfils this function. The second fly-eye lens 4 and the PBS array 81 are arranged with a predetermined gap therebetween, and the shading plate 85 is arranged in this gap.

The outline of each lens 10 having a rectangular shape as seen in plan view, which constitutes the second fly-eye lens 4, is shown by a two-dot chain line in FIG. 18A and FIG. 18B. In this embodiment, the shading plate 85 comprises two shading plates 85A and 85B, which extend vertically along the boundary of the horizontally adjacent lenses 10, and are overlapped in a transmission direction of light. In the non-dimming state, as shown in FIG. 17A and FIG. 18A, the two shading plates 85A and 85B are completely overlapped on each other, and the central axis of the two shading plates 85A and 85B overlaps on the boundary of the laterally adjacent lenses 10. These shading plates 85A and 85B are moved in parallel (slide) in a direction along the principal plane, by a drive mechanism (not shown) such as a stepping motor. When dimming is applied, as shown in FIG. 17B and FIG. 18B, the two shading plates 85A and 85B slide in a horizontally opposite direction to each other by the same distance, to thereby shade a predetermined area at the opposite ends of the lenses 10. For example, while the shading plate 85A on the second fly-eye lens 4 side moves leftward shown by an arrow in FIG. 18B (upward in FIG. 17B), the shading plate 85B on the PBS array 81 side moves rightward (downward in FIG. 17B). By such operation of the shading plate 85, in the lighting apparatus 80 of this embodiment, the two shading plates 85A and 85B perform shading in left-right symmetry, with respect to the axis passing through the center of each lens 10 of the second fly-eye lens 4.

If it is assumed that only one side of each lens of the second fly-eye lens is shaded for all lenses, the illuminance distribution may have a polarization such that only one side of the screen is bright, and the remaining other side is dark. On the contrary, the lighting apparatus 80 of this embodiment has the sliding type shading plate 85, and shading is performed in left-right symmetry with respect to the axis passing through the center of each lens 10 of the second fly-eye lens 4. Therefore, the illuminance distribution at the liquid crystal light valve, being the area to be lighted, becomes left-right symmetrical with respect to the axis passing through the center of the liquid crystal light valve. As a result, the appearance of the projected image can be improved, without a polarization such that only one side of the screen is bright, and the remaining other side is dark.

Moreover, in view of the construction of the current projection type display of a three-plate method, since the optical path of one color of three colors passes through a relay lens, only an image corresponding to this one color has to be reversed vertically or horizontally with respect to the other two color images. Therefore, if it is assumed to use a lighting apparatus which shades only one side of each lens in the second fly-eye lens, for example, in images corresponding to R and G, the right side of the image is bright and the left side is dark, and on the other hand, in an image corresponding to B, the right side of the screen is dark and the left side is bright, causing a problem in that the color balance changes on the right and left sides of the screen. However, according to the lighting apparatus 80 of this embodiment, since the illuminance distribution at the liquid crystal light valve becomes linearly symmetrical with respect to the central axis, an image having uniform color balance on the opposite sides of the screen can be reproduced.

In this embodiment, since the two shading plates 85A and 85B also serve as a shading plate which prevents the outgoing beam from the light source from directly entering into the reflection film 83 in the PBS array 81, another shading plate is not necessary, and hence the apparatus configuration can be simplified. Moreover, since a gap is provided between the second fly-eye lens 4 and the two shading plates 85A and 85B, cooling air can be made to flow in this gap. Hence, by shading strong light from the light source 2, the shading plates 85A and 85B whose temperature has risen can be cooled.

As shown in FIG. 18A and FIG. 18B, the edges of the shading plates 85A and 85B extend linearly. However, instead of this shape, there may be used a shape, as shown in FIG. 19A and FIG. 19B, in which the vertically central portion of each lens 10 at the edges of the shading plates 87A and 87B is depressed curvilinearly. Since the light emitted from the light source 2 has a substantially centrosymmetrical illuminance distribution at the position of the shading plate, the illuminance distribution can be equalized on the screen by using the shading plates 87A and 87B having such a shape.

[Lighting Apparatus-9]

A lighting apparatus according to a ninth embodiment of the present invention will be described with reference to FIGS. 20A and 20B and FIGS. 21A and 21B.

The basic construction of the lighting apparatus of this embodiment is the same as that of the eighth embodiment, and a PBS array is provided on the outgoing side of the second fly-eye lens, and a shading plate is provided between the second fly-eye lens and the PBS array. Therefore, illustration of the whole construction is omitted. The construction of the shading plate is slightly different from that of the eighth embodiment.

Figure 21A:
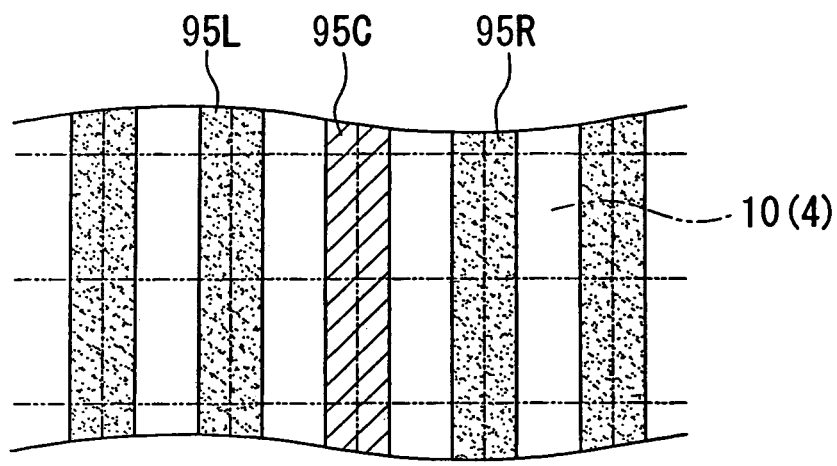
FIGS. 21A and 21B are elevation views of a shading plate in the lighting apparatus, FIG. 21A showing a state where dimming is not applied, and FIG. 21B showing a state where dimming is applied.
Figure 21B:
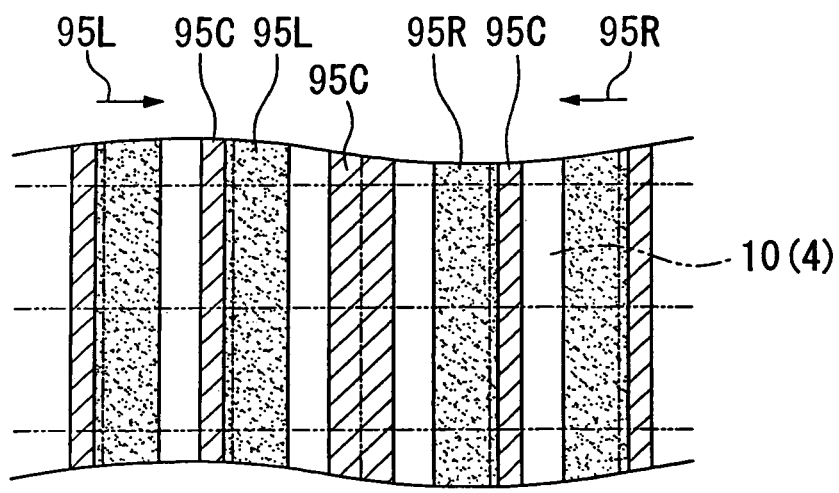

FIGS. 20A and 20B are enlarged plan views showing the lighting apparatus of this embodiment, taking out only the portion of the second fly-eye lens and the PBS array, and FIGS. 21A and 21B are elevation views of a shading plate. FIG. 20A and FIG. 21A show a state where dimming is not applied, and FIG. 20B and FIG. 21B show a state where dimming is applied.

As shown in FIGS. 20A and 20B, in the lighting apparatus of this embodiment, a shading plate 95 is arranged between the second fly-eye lens 4 and the PBS array 81, as in the eighth embodiment. The point that the shading plate 95 extends vertically along the boundary of the horizontally adjacent lenses 10 is the same as in the eighth embodiment. However, in this embodiment, a shading plate 95C on the PBS array 81 side, of two shading plates 95R, 95L and 95C, is fixed in position, and arranged on the incident side of the reflection film 83 of the PBS array 81. On the other hand, the shading plates 95R and 95L on the second fly-eye lens 4 side are moved in parallel (slide) in a direction along the principal plane.

FIGS. 20A and 20B show the central portion of the second fly-eye lens 4, and only the shading plate along the boundary of the lenses, being the center of the whole second fly-eye lens 4, is composed of only one shading plate 95C on the PBS array 81 side, with the position thereof fixed. In the state where dimming is not applied, as shown in FIGS. 20A and 21A, the two shading plates 95R, 95L and 95C are completely overlapped, with the central axis of the two shading plates 95R, 95L and 95C overlapping on the boundary of horizontally adjacent lenses. At the time of dimming, as shown in FIGS. 20B and 21B, regarding the shading plates 95R and 95L on the second fly-eye lens 4 side, formed so as to be movable, the shading plate 95R located on the right side and the shading plate 95L located on the left side, with respect to the central shading plate 95C, slide horizontally in an opposite direction to each other by the same distance, to thereby shade a predetermined area at the opposite ends of the lens 10. For example, while the right shading plate 95R moves leftward as shown by an arrow in FIG. 21B (in FIG. 20B, the lower shading plate moves upward), the left shading plate 95L moves rightward (in FIG. 20B, the lower shading plate moves downward). By such operation of the shading plate 95, in the lighting apparatus of this embodiment, the two shading plates 95R, 95L and 95C perform shading in left-right symmetry, with respect to the axis passing through the center of the whole second fly-eye lens 4.

This embodiment is different from the eighth embodiment in that shading is not performed in linear symmetry for each lens 10, but shading is performed so as to be linearly symmetrical with respect to the whole second fly-eye lens 4. In this case, illuminance distribution occurs in each lens 10 due to shading, but the illuminance distribution becomes uniform with respect to the image obtained by superimposing the respective beams of the lenses 10. As a result, the same effects as those of the eighth embodiment can be obtained also in the lighting apparatus of this embodiment, that is, the appearance of the projected image can be improved, without a polarization such that only one side of the screen is bright, and the remaining other side is dark; and an image having uniform color balance can be reproduced on the opposite sides of the screen.

In the eighth and ninth embodiments, an example of a shading plate extending vertically along the boundary of horizontally adjacent lenses has been described. On the contrary, a shading plate may be provided, extending horizontally along the boundary of vertically adjacent lenses. Also in this case, a similar effects can be obtained. In FIG. 19A and FIG. 19B, shading plates 87A and 87B having edges of a shape such that the central portion of each lens is slightly depressed are shown. However, instead of this construction, for example, a shading plate having a construction like a diaphragm of a camera may be provided, so that the shape of the optical transmission area becomes close to a round shape, thereby enabling the illuminance distribution on the screen to be further equalized.

The technical range of the present invention is not limited to the above described embodiments, and can be variously changed without departing from the scope of the present invention. For example, the shape, number, and arrangement of the shading plate is not limited to those shown in the embodiments, and can be variously changed. In the above embodiments, a shading plate having optical reflectivity is used, but a shading plate having optical absorptivity may be used. In this case, aluminum applied with black alumite treatment can be used as the material for the shading plate. In the above embodiments, an example of a projection type liquid crystal display using a liquid crystal light valve as the optical modulation device has been described. However, it is also possible to apply the present invention to a projection type display using a DMD as the optical modulation device.

EXAMPLE

The present inventors actually produced the lighting apparatus in the first embodiment, and evaluated whether the shading plate can realize a desired dimming function. FIG. 14 is a diagram showing the evaluation result, wherein the relation between an angle of inclination of the shading plate and the brightness on the screen is shown. In FIG. 14, the X-axis plots an angle of inclination (degree) of the shading plate, and 0 degree indicates a state where the direction of the shading plate is parallel to the optical axis. The Y-axis plots brightness (%) on the screen face, being designated as 100%, when the angle of inclination of the shading plate is 0 degree.

As is obvious from FIG. 14, there is a trend that as the angle of inclination of the shading plate increases from 0 degree, the brightness on the screen drops from the vicinity of 100%, and it has found that when the angle of inclination is 30 degree or more, the brightness on the screen drops to about 30%. Therefore, according to the lighting apparatus of the present invention, it is demonstrated that beams having a desired brightness can be obtained on the screen by controlling the angle of inclination of the shading plate.

INDUSTRIAL APPLICABILITY

According to the lighting apparatus of the present invention, even if the optical output intensity from the light source is constant, beams having brightness corresponding to an image can be obtained in an area to be lighted, thereby contributing to the extension of the dynamic range of a projection type display. By using this lighting apparatus, a projection type display having excellent effects in image expressive power and adaptability to the use environment can be realized. Hence, the lighting apparatus of the present invention is industrially useful.

What is claimed is:

1. A lighting apparatus used for lighting an optical modulation device in a projection type display, comprising:
    a light source,
    a uniform lighting device which equalizes the illuminance distribution of light shone from the light source, and
    a dimming device for adjusting the amount of light emitted from the light source, which is arranged on an optical axis of the light emitted from the light source,
    the dimming device including a shading plate constructed such that at least a portion of light emitted from the light source is cut off,
    the shaded area of the outgoing beam being adjusted by a movement of the shading plate,
    the amount of light emitted from the uniform lighting device being adjusted by controlling the dimming device based on the information from outside, and
    the shading plate being structured to be movable in a direction parallel with the principal plane thereof, and the amount of light being adjusted by the shift amount of the shading plate.

2. The lighting apparatus according to claim 1, the shading plate being arranged between the fly-eye lens and the convolution lens.

3. The lighting apparatus according to claim 1, the shading plate being arranged in the vicinity of the focal point of each lens constituting the fly-eye lens.

4. The lighting apparatus according to claim 1, the shading plate being arranged on the outgoing side of the convolution lens.

5. The lighting apparatus according to claim 1, the shading plate performing shading in linear symmetry with respect to each of the beams of light emitted from the fly-eye lenses.

6. The lighting apparatus according to claim 1, the shading plate performing shading centrosymmetrically with respect to each of the beams of light emitted from the fly-eye lenses.

7. The lighting apparatus according to claim 1, the shading plate performing shading in linear symmetry with respect to the center of a group of beams emitted from the fly-eye lenses.

8. The lighting apparatus according to claim 1, the shading plate performing shading centrosymmetrically with respect to the center of a group of beams emitted from the fly-eye lenses.

9. The lighting apparatus according to claim 5, further comprising:
    another shading plate,
    the two shading plates being arranged between adjacent beams of light emitted from the fly-eye lens, each of the shading plates has a slit opening provided perpendicularly to the optical axis, and
    the two shading plates being movable in a direction parallel with the respective principal planes and in an opposite direction to each other.

10. The lighting apparatus according to claim 7, further comprising:

at least two shading plates, the at least three shading plates being provided perpendicularly to the optical axis, one of the at least three shading plates being fixed in position, and the remaining shading plates located at a position of linear symmetry with respect to the center of the group of beams emitted from the fly-eye lens being movable in an opposite direction to each other.

11. The lighting apparatus according to claim 1, the shading plate being arranged between the fly-eye lens and the light source.

12. The lighting apparatus according to claim 11, further comprising at least one shading plate, the shading plates being arranged along a plane perpendicular to the optical axis.

13. The lighting apparatus according to claim 12, the size of each of the plurality of shading plates or the pitch of the plurality of shading plates being different depending on the location.

14. The lighting apparatus according to claim 1, at least the surface on the side irradiated by the light, of the shading plate, having optical absorptivity.

15. The lighting apparatus according to claim 1, at least the surface on the side irradiated by the light, of the shading plate, having optical reflectivity.

16. The lighting apparatus according to claim 15, a light absorbing material for absorbing the reflected light being provided at a position where the reflected light from the shading plate reaches.

17. A projection type display having a lighting device, an optical modulation device for modulating beams emitted from the lighting device, and a projection device for projecting the beams modulated by the optical modulation device, which comprises a lighting apparatus according to claim 1, as the lighting device.

18. A projection type display according to claim 17, further comprising:

a control signal determination device for determining a control signal which controls the dimming device based on an image signal;

a dimming control device for controlling the dimming device based on the control signal; and an image signal extension device for extending the image signal based on the control signal.

19. A driving method for a projection type display according to claim 17, a control signal for controlling the dimming device being determined based on an image signal, and the dimming device being controlled based on the control signal, to thereby adjust the amount of light which illuminates the optical modulation device, and to extend the image signal based on the control signal, and the extended image signal being supplied to the optical modulation device to thereby generate an image.

20. A lighting apparatus used for lighting an optical modulation device in a projection type display, comprising:

a light source, a uniform lighting device which equalizes the illuminance distribution of light shone from the light source, and a dimming device for adjusting the amount of light emitted from the light source, the dimming device being rotationally arranged on an optical axis of the light emitted from the light source, the dimming device including a shading plate constructed such that at least a portion of light emitted from the light source is cut off, the shaded area of the outgoing beam being adjusted by a movement of the shading plate, and the amount of light emitted from the uniform lighting device being adjusted by controlling the dimming device based on the information from outside.

21. The lighting apparatus according to claim 1, the principal plane being perpendicular to the optical axis.

* * * * *